US012706738B2

(12) United States Patent
Patel et al.

(10) Patent No.: US 12,706,738 B2
(45) Date of Patent: Aug. 11, 2026

(54) SYSTEMS AND METHODS FOR DECENTRALIZED DATA DISTRIBUTION

(71) Applicant: Synchrony Bank, Stamford, CT (US)

(72) Inventors: Manish Patel, Stamford, CT (US); Stephen Short, Stamford, CT (US); Rojarani Sonena, Stamford, CT (US); Archana Gandhiraj, Stamford, CT (US)

(73) Assignee: Synchrony Bank, Stamford, CT (US)

( * ) Notice: Subject to any disclaimer, the term of this patent is extended or adjusted under 35 U.S.C. 154(b) by 91 days.

(21) Appl. No.: 18/953,253

(22) Filed: Nov. 20, 2024

(65) Prior Publication Data

US 2025/0167983 A1 May 22, 2025

Related U.S. Application Data

(60) Provisional application No. 63/601,303, filed on Nov. 21, 2023.

(51) Int. Cl.

| | |
|---|---|
| ***H04L 9/00*** | (2022.01) |
| ***H04L 9/08*** | (2006.01) |
| ***H04L 9/30*** | (2006.01) |
| *G06Q 20/36* | (2012.01) |

(52) U.S. Cl.
CPC .............. *H04L 9/0825* (2013.01); *H04L 9/30* (2013.01); *G06Q 20/36* (2013.01)

(58) Field of Classification Search
None
See application file for complete search history.

(56) References Cited

U.S. PATENT DOCUMENTS

| | | | | |
|---|---|---|---|---|
| 11,966,917 | B2 * | 4/2024 | Bessonov | G06Q 20/389 |
| 12,063,309 | B2 * | 8/2024 | Petersen | G06F 21/6254 |
| 2021/0117554 | A1 * | 4/2021 | Dikhit | H04L 9/3297 |
| 2021/0290146 | A1 * | 9/2021 | Sorgenfrei | G06F 3/015 |
| 2023/0283466 | A1 * | 9/2023 | Suzuki | H04L 9/3247 713/167 |
| 2024/0161077 | A1 * | 5/2024 | Bowman | G06Q 20/3829 |

* cited by examiner

*Primary Examiner* — Trang T Doan
(74) *Attorney, Agent, or Firm* — Polsinelli PC

(57) ABSTRACT

Systems and methods provide a framework through which user data is automatically propagated to different service provider systems through one or more decentralized distributed ledger nodes in response to modification of the user data and to changes to service provider systems authorized to access the user data.

21 Claims, 11 Drawing Sheets

300
IDENTITY MANAGEMENT SYSTEM 102
USER ACCOUNTS 206
UPDATED DATA
DIST. REQUEST
KEY DISTRIBUTION SUB-SYSTEM 208
USER INFORMATION PROCESSOR 202
302
CRYPTOCONTRACT GENERATOR 204
UPDATED DATA
NEW PUBLIC KEY
302
DATA UPDATE
NEW PUBLIC KEY
302
112
USER
UPDATED INFO.
DECENTRALIZED DISTRIBUTED LEDGER 104
302
NEW PUBLIC KEY
SERVICE PROVIDER SYSTEM(S) 114
302
NEW PUBLIC KEY
UPDATED USER INFORMATION

SYSTEMS AND METHODS FOR DECENTRALIZED DATA DISTRIBUTION

CROSS-REFERENCE TO RELATED APPLICATIONS

The present patent application claims the priority benefit of U.S. provisional patent application No. 63/601,303 filed Nov. 21, 2023, the disclosures of which are incorporated by reference herein.

FIELD

The present disclosure relates generally to a framework through which user data is automatically propagated to different service provider systems through one or more decentralized distributed ledger nodes in response to modification of the user data and to changes to service provider systems authorized to access the user data.

SUMMARY

Disclosed embodiments provide a framework for automatically propagating user data to different service provider systems through one or more decentralized distributed ledger nodes according to changes made to the user data and to any authorization changes made according to provided distribution lists. According to some embodiments, a computer-implemented method is provided. The computer-implemented method comprises receiving a request to update user data associated with a user. The request includes a private cryptographic key corresponding to the user. The computer-implemented method further comprises identifying a set of service provider systems authorized to receive the user data. The set of service provider systems maintains nodes within a decentralized distributed ledger. The computer-implemented method further comprises encrypting the updated user data using the private cryptographic key, resulting in encrypted user data. The computer-implemented method further comprises encoding the encrypted user data in the decentralized distributed ledger. When the encrypted user data is encoded, a cryptocontract associated with the user data and the decentralized distributed ledger automatically generates a public cryptographic key usable to decrypt the encrypted user data. The computer-implemented method further comprises providing the public cryptographic key. When the public cryptographic key is obtained by the set of service provider systems, the nodes associated with the set of service provider systems automatically use the public cryptographic key to decrypt the encrypted user data.

In some embodiments, the computer-implemented method further comprises receiving a request to deauthorize a service provider system associated with the set of service provider systems from accessing the user data. The computer-implemented method further comprises encoding the encrypted user data in the decentralized distributed ledger to cause the cryptocontract to automatically generate a new public cryptographic key. The new public cryptographic key is not provided to the service provider system.

In some embodiments, the public cryptographic key is provided through an encrypted update message. Further, the encrypted update message is generated using private cryptographic keys associated with the set of service provider systems.

In some embodiments, the computer-implemented method further comprises receiving a request to add a new service provider system to the set of service provider systems. The computer-implemented method further comprises encrypting the public cryptographic key using a private cryptographic key associated with the new service provider system to provide the public cryptographic key to the new service provider system.

In some embodiments, the private cryptographic key corresponding to the user is provided through a user digital wallet.

In some embodiments, the set of service provider systems are identified through a distribution list. Further, the distribution list specifies unique foreign identifiers corresponding to the set of service provider systems.

In some embodiments, the public cryptographic key is provided through one or more application programming interface (API) calls to the set of service provider systems.

In an example, a system comprises one or more processors and memory including instructions that, as a result of being executed by the one or more processors, cause the system to perform the processes described herein. In another example, a non-transitory computer-readable storage medium stores thereon executable instructions that, as a result of being executed by one or more processors of a computer system, cause the computer system to perform the processes described herein.

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Illustrative embodiments are described in detail below with reference to the following figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Disclosed embodiments may provide a framework through user data is automatically propagated to different service provider systems through one or more decentralized distributed ledger nodes in response to modifications to the user data. Further, as service provider systems are authorized to or de-authorized from accessing the user data, the provided framework automatically updates the decentralized distributed ledger nodes to limit access to the user data to those service provider systems authorized to do so.

Figure 1:
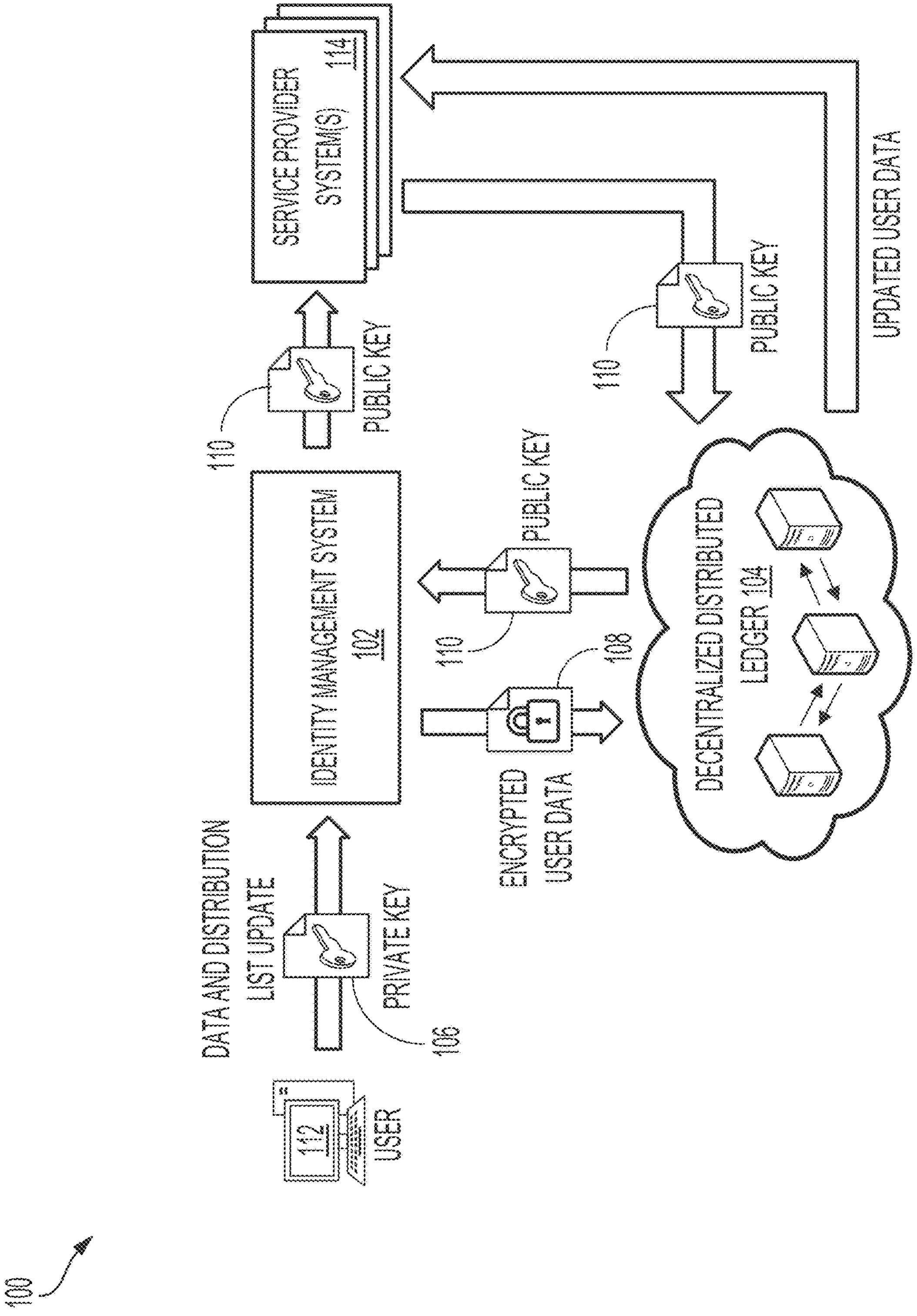
FIG. 1 shows an illustrative example of an environment in which an identity management system updates and encrypts user data through a decentralized distributed ledger and dynamically generates a public cryptographic key corresponding to the encrypted user data for distribution to a set of service provider systems in accordance with at least one embodiment.

FIG. 1 shows an illustrative example of an environment 100 in which an identity management system 102 updates and encrypts user data through a decentralized distributed ledger 104 and dynamically generates a public cryptographic key 110 corresponding to the encrypted user data for distribution to a set of service provider systems 114 in accordance with at least one embodiment. In the environment 100, a user 112 transmits to the identity management system 102 a request to update their user data and to distribute this updated user data to a set of service provider systems 114 associated with the identity management system 102. The user data associated with the user 112 may include, for example, the user's contact information (e.g., telephone number, electronic mail address, geographic address, etc.). In some instances, the user data may include personally identifiable information (PII) such as a Social Security number (SSN), a passport number, a driver's license number, a taxpayer identification number, financial account numbers (e.g., checking account numbers, savings account numbers, etc.), payment instrument account numbers, and the like. In some instances, the user 112 may submit a request to update their user data for any number of reasons (e.g., moving to a new location, obtaining a new driver's license, obtaining a new payment instrument, etc.).

The user 112 may be associated with one or more service provider systems 114, through which the user 112 may maintain disparate accounts. The service provider systems 114, for instance, may correspond to different service providers such as financial institutions, utility companies, telecommunications companies, cable television providers, and the like. The user 112 may maintain different accounts for each of these service provider systems 114, through which the user 112 may maintain different versions of their user data. As an illustrative example, when a user 112 moves to a new location resulting in a change to their geographic address, the user 112 may remember to update their accounts for one or more service provider systems 114 to indicate their new geographic address while forgetting to do so for other accounts associated with other service provider systems 114. This may result in disparate versions of their user data being maintained by these different service provider systems 114. Further, in some instances, the user 112 may no longer wish for a particular service provider system to have access to their user data (e.g., the user 112 wishes to close their account with the particular service provider system, etc.). As the user 112 may have many disparate accounts associated with myriad service provider systems 114, it may be difficult and time consuming for the user 112 to manually access these myriad service provider systems 114 to update these disparate accounts. Additionally, the myriad service provider systems 114 may each implement different mechanisms available to users for updating their accounts. Thus, a user 112 may traditionally be required to navigate multiple and different mechanisms for updating their accounts across different service providers.

Figure 11:
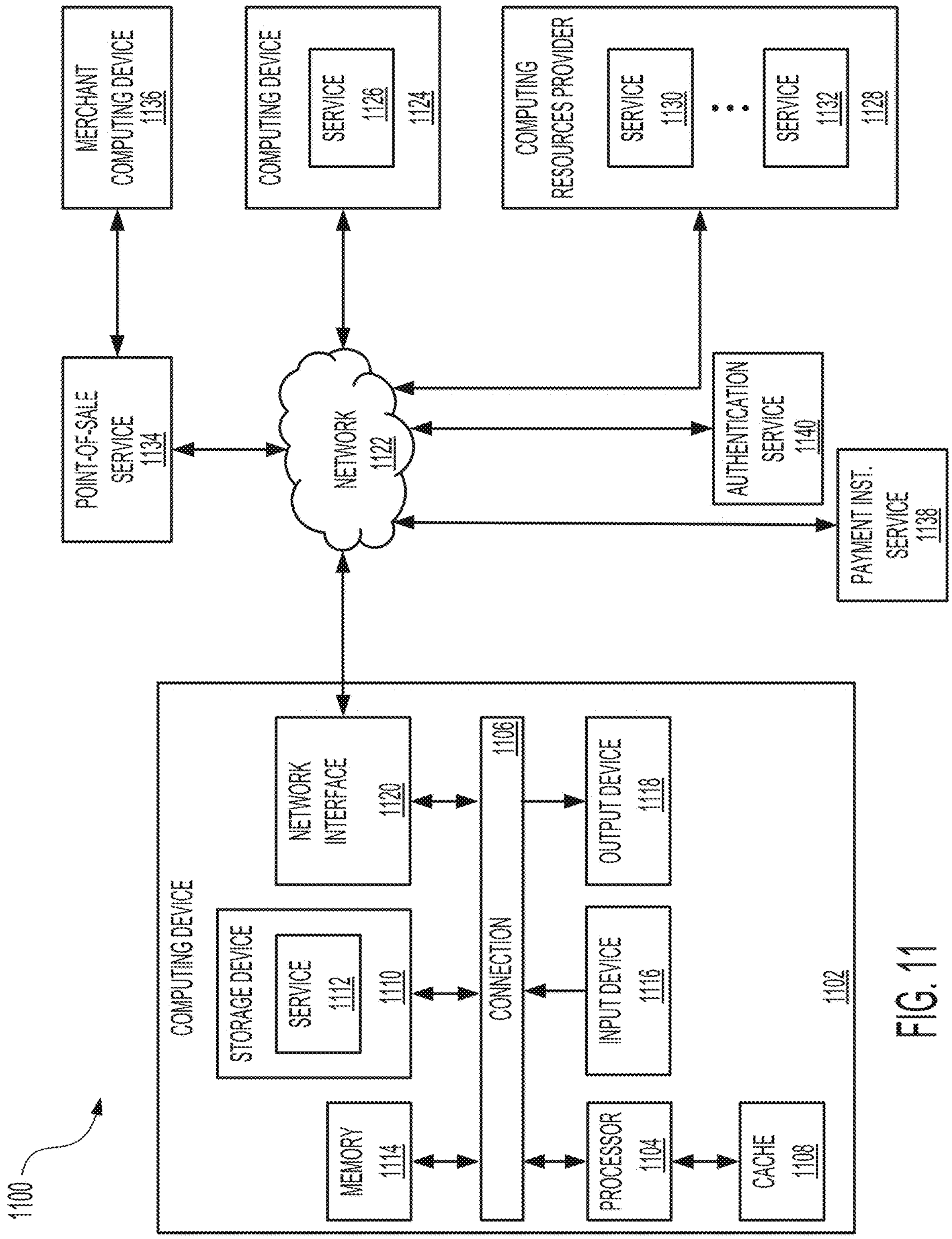
FIG. 11 shows a computing system architecture including various components in electrical communication with each other using a connection in accordance with various embodiments.

In an embodiment, the identity management system 102 includes a set of computer systems that collectively implement a service (such as service 1112 described herein at least in connection with FIG. 11) through which users may provide and update user data for automatic distribution to different service provider systems 114 according to defined distribution lists. In an embodiment, the identity management system 102 is associated with a payment instrument service that, for example, processes applications for payment instruments, issues payment instruments, determines user-specific allowances to payment instruments, processes transactions associated with payment instruments, processes cancellations of accounts associated with payment instruments, and performs other such operations. In an embodiment, this payment instrument service is a service provided by a computing resources provider such as the computing resource provide 1128 described herein at least in connection with FIG. 11 (e.g., a service such as service 1130 and/or service 1132 described herein at least in connection with FIG. 11). In an embodiment, the payment instrument service is a payment instrument service such as the payment instrument service 1138 described herein at least in connection with FIG. 11. In some instances, the payment instrument service may be a service operated by the issuer of the payment instruments described herein. In some instances, the payment instrument service may be a service operated by a third-party on behalf of the issuer of the payment instruments described herein. The user 112 may be associated with the identity management system 102 through one or more payment instrument accounts maintained by the payment instrument service.

In an embodiment, the one or more payment instrument accounts indicate user data associated with the user 112 (e.g., user contact information, user account information, etc.) that may be relevant to one or more service provider systems 114. For instance, for a particular account maintained by a service provider system, the user 112 may have implemented automatic payments to the particular account through an existing payment instrument account associated with the identity management system 102. For automatic payments to be processed, the user 112 may be required to provide and maintain up-to-date user data corresponding to the user 112 and the payment instrument account. Thus, when there is a change made to the user data associated with the payment instrument account (e.g., a change is made to the user's geographic address, a new primary account number is issued, etc.), the user 112 may be required to update the account associated with the service provider system to prevent rejection of automated payments made using the payment instrument account.

In an embodiment, the user 112 provides, in their request to update their user data and to distribute this updated user data to a set of service provider systems 114, a private cryptographic key 106 that may be used by the identity management system 102 to dynamically encrypt the updated user data. The private cryptographic key 106 may be associated with a cryptographic key pair that can be used to encrypt user data that may be provided to indicated service provider systems 114. This cryptographic key pair may be generated using one or more public cryptographic key cryptosystems, such as RSA or any other asymmetric cryptographic key algorithm (e.g., elliptic curve cryptography, etc.). This cryptographic key pair may be generated to prevent exposure of the user data to entities not authorized to access the user data (e.g., entities not indicated by the user 112 as being authorized to access the user data, entities not associated with the identity management system 102, etc.). For instance, and as described in greater detail herein, the public cryptographic key 110 associated with the cryptographic key pair may be distributed to the user 112 and service provider systems 114 designated by the user 112 as being authorized to access the user data.

In an embodiment, the cryptographic key pair (including the private cryptographic key 106) is generated in response to a user onboarding request submitted by the user 112 to the identity management system 102. For instance, the identity management system 102 may provide an interface, such a graphical user interface (GUI), through which the user 112 may submit an onboarding request to allow for automatically updating and distribution of user data to authorized service provider systems. Through the GUI, the user 112 may be prompted to provide a set of credentials or other information that may be used to authenticate the user 112 (e.g., username and password, one-time password, cryptographic token, etc.). If the user 112 is successfully authenticated, the identity management system 102 may prompt the user 112 to verify their user data as maintained by the identity management system 102 or other entity associated with the identity management system 102 (e.g., a payment instrument service, a financial institution, etc.).

If the user 112 verifies that the user data maintained by the identity management system 102 is accurate, the identity management system 102 may deploy a cryptocontract that, when executed, may automatically encrypt the user data and record the encrypted user data within a decentralized distributed ledger 104. The decentralized distributed ledger 104 may be a decentralized database managed by various members across multiple nodes. This decentralized database may be shared, replicated, and synchronized amongst these various members within a decentralized network. These members within the decentralized network may govern and agree by consensus on updates to the records in the decentralized distributed ledger 104. The decentralized distributed ledger 104 is, thus, decentralized by virtue of having no central authority or mediator involved in the governance of the decentralized distributed ledger 104. Each record that is maintained in the decentralized distributed ledger 104 may have a timestamp and unique cryptographic signature, which may be used to audit the decentralized distributed ledger 104 and to provide a comprehensive history of transactions (e.g., data recorded within the decentralized distributed ledger 104) within the decentralized network. As contemplated herein, any type of decentralized distributed ledger 104 may be used that supports the creation and implementation of cryptocontracts and for the recording and distribution of user data. Thus, the decentralized distributed ledger 104 may include a public or private blockchain, Hashgraph, Directed Acyclic Graph (DAG), Holochain, Radix Tempo, and the like.

A cryptocontract may be a collection of programmatic code and data that may reside at a specific address on the decentralized distributed ledger 104. The cryptocontract may be deployed to the decentralized network of the decentralized distributed ledger 104 and may function as programmed by the identity management system 102. The identity management system 102, through one or more nodes implemented in the decentralized network of the decentralized distributed ledger 104, may interact with the cryptocontract by submitting user data and/or updates to distribution lists for the user data on behalf of users to execute one or more functions defined in the cryptocontract, as described in greater detail herein.

In an embodiment, the cryptocontract is deployed by the identity management system 102 through a corresponding node within the decentralized distributed ledger 104. This node may execute the cryptocontract associated with the user 112 and their corresponding user data to automatically generate the aforementioned cryptographic key pair. The cryptocontract may use the resulting private cryptographic key 106 to encrypt the user data associated with the user 112. Additionally, the cryptocontract may automatically record the encrypted user data in the decentralized distributed ledger 104. The cryptocontract, through the node implemented by the identity management system 102 in the decentralized distributed ledger 104, may return the cryptographic key pair to the identity management system 102 for distribution to the user 112.

In an embodiment, in response to receiving the cryptographic key pair from the cryptocontract, the identity management system 102 adds the cryptographic key pair to the user's digital wallet via the decentralized distributed ledger 104. The digital wallet may be a software-based cryptocurrency wallet that is used to interact with the decentralized distributed ledger 104. In some instances, the identity management system 102 may generate the digital wallet for the user 112 during the user onboarding process and recorded in the decentralized distributed ledger 104. Alternatively, the user 112 may use and designate an existing digital wallet for storing the cryptographic key pair. The cryptographic key pair, in some examples, can be automatically issued and held by the user 112 in their digital wallet and recorded in the decentralized distributed ledger 104 such that, through the digital wallet, the user 112 may be able to access the cryptographic key pair.

Returning to the example illustrated in FIG. 1, when the user 112 submits a request to update their user data and/or to update the list of service provider systems that are authorized to access the user data, the user 112 may provide their private cryptographic key 106. For instance, through their digital wallet, the user 112 may transmit the private cryptographic key 106 to the node associated with the identity management system 102 in the decentralized distributed ledger 104. Further, through the GUI provided by the identity management system 102, the user 112 may update their user data (e.g., provide a new geographic address, provide a new electronic mail address, provide new account details, etc.). As noted above, the user 112 may further define which service provider systems 114 are authorized to access the user data associated with the user 112. For instance, through the GUI, the user 112 may define a distribution list that includes unique identifiers corresponding to the different service provider systems to which the user 112 would like to distribute the user data. This distribution list may be updated by the user 112 at any time such that, through this distribution list, the user 112 may authorize and deauthorize access by different service provider systems 114 to the user data through the decentralized distributed ledger 104. Thus, through the distribution list, user data associated with the user 112 may only be distributed to those service provider systems 114 authorized by the user 112 to receive the user data. This provides the user 112 with a mechanism to update their user data once through the identity management system 102 and distribute this user data to only those service provider systems 114 designated by the user 112 through the identity management system 102. This may result in increased computer efficiency, as the user 112 may no longer be required to access, through their computer system, myriad and disparate service provider systems 114 to update their user data for different user accounts.

In an embodiment, for a service provider system to receive user data associated with the user 112 from the decentralized distributed ledger 104, the service provider system implements a node within the decentralized distributed ledger 104 that can receive messages from the identity management system 102 (such as through the node implemented by the identity management system 102 in the decentralized distributed ledger 104). For instance, a service provider system may transmit a request to the identity management system 102 to join the decentralized distributed ledger 104. This request may include a unique identifier corresponding to the service provider system. The unique identifier may correspond to a foreign identifier used by the service provider system to identify their users within the service provider system ecosystem. In response to the onboarding request from the service provider system, the identity management system 102 may perform a vetting process to ensure that the service provider system is not a malicious entity and that the service provider system provides legitimate services to users. Through this vetting process, the identity management system 102 may provide enhanced security to users (such as user 112) and accordingly make available user data only to vetted and authorized service provider systems 114. This further provides additional benefits to users, as this may reduce the risk of users accessing spoofed or otherwise malicious systems mimicking different service provider systems 114 when attempting to update their user data.

If the identity management system 102 approves the onboarding request from the service provider system, the identity management system 102 may authorize the service provider system to provision and deploy their own node within the decentralized distributed ledger 104. Additionally, once this node has been deployed in the decentralized distributed ledger 104, the identity management system 102 may deploy, through its node, a new cryptocontract corresponding to the particular service provider system. This new cryptocontract, when executed, may automatically generate a cryptographic key pair specific to the node associated with the service provider system. This cryptographic key pair may be used to encrypt messages transmitted by the identity management system 102 to the service provider system through the decentralized distributed ledger 104. The public cryptographic key associated with this cryptographic key pair may be provided to the service provider system to allow the service provider system to decrypt any messages from the identity management system 102. This unique cryptographic key pair may thus be used to prevent other service provider systems and other unauthorized entities from accessing these messages from the identity management system 102 to the particular service provider system.

When the user 112 updates their user data and provides their private cryptographic key 106 for encryption of their updated user data, the identity management system 102 may automatically use the private cryptographic key 106 to generate encrypted user data 108. The encrypted user data 108 may be digitally signed using the private cryptographic key 106 such that a recipient of the encrypted user data 108 (using a corresponding public cryptographic key) may verify the authenticity of the encrypted user data 108 and, accordingly, decrypt the encrypted user data 108 to obtain the updated user data. In an embodiment, the identity management system 102, upon encrypting the updated user data using the private cryptographic key 106, executes the cryptocontract associated with the user 112 and their corresponding user data to record the encrypted user data 108 in the decentralized distributed ledger 104.

The cryptocontract, in an embodiment, further generates a new public cryptographic key 110 corresponding to the encrypted user data 108. As the encrypted user data 108 may incorporate updated user data, a new public cryptographic key 110 may need to be generated to allow for decryption of the encrypted user data 108. Further, any holders of older public cryptographic keys that are no longer authorized to access user data associated with the user 112 (e.g., service provider systems not included in a provided distribution list, etc.) may be unable to access the updated user data from the decentralized distributed ledger 104. As described in greater detail herein, this ensures that the user data is only accessible by those service provider systems designated by the user 112 as being authorized to receive the user data.

In an embodiment, the cryptocontract further automatically generates new messages that include the new public cryptographic key 110 for distribution to the service provider systems 114 indicated in the provided distribution list. As noted above, the node associated with the identity management system 102 may maintain a unique cryptographic key pair for each service provider system 114 that maintains a node within the decentralized distributed ledger 104. For each service provider system authorized to receive the updated user data, the cryptocontract may automatically generate a unique message that encodes the unique identifier corresponding to the service provider system and the public cryptographic key 110 generated by the cryptocontract for the updated user data. The cryptocontract may further use the private cryptographic key associated with the service provider system to encrypt the unique message encoding the public cryptographic key 110. This may prevent exposure of the new public cryptographic key 110 to other service provider systems 114 and other entities (e.g., malicious computer systems, eavesdropping systems, etc.) not authorized to receive the updated user data, thereby enhancing the security of the identity management system 102 and the decentralized distributed ledger 104. Further, because each unique message is tailored for a particular service provider system, only the service provider system designated to receive the unique message may be able to decrypt the unique message, thereby preventing exposure of the contents of the unique message to any other service provider system and other unauthorized entities.

In some instances, the identity management system 102 may transmit the encrypted messages including the public cryptographic key 110 to the corresponding service provider systems 114 through the decentralized distributed ledger 104. For instance, the node associated with the identity management system 102 may automatically transmit these encrypted messages to the nodes corresponding to the service provider systems 114 within the decentralized distributed ledger 104. Alternatively, the identity management system 102 may transmit the encrypted messages including the public cryptographic key 110 to the service provider systems 114 through one or more application programming interface (APIs) that are exposed to these service provider systems 114 by the identity management system 102.

In response to receiving an encrypted message that includes the public cryptographic key 110, a service provider system may use the system-specific public cryptographic key provided by the identity management system 102 during an onboarding process associated with the service provider system to decrypt the encrypted message. From the decrypted message, the system service provider may obtain the public cryptographic key 110 and retrieve the encrypted user data 108 from the decentralized distributed ledger 104. For instance, through its node within the decentralized distributed ledger 104, the service provider system may evaluate the blockchain to obtain the encrypted user data 108 and use the received public cryptographic key 110 to decrypt the encrypted user data 108. Using the decrypted user data, the service provider system may automatically update its databases to incorporate the updated user data without any additional user intervention. Thus, the service provider systems 114 receiving the updated user data may accordingly update their own databases according to their implemented mechanisms and formats without the user 112 being required to know how to navigate these mechanisms and formats. This may provide significant benefits over traditional methods and techniques. For instance, through the embodiments described herein, a service provider system may no longer be required to implement additional systems and/or processes for different users to provide their updated user data for updating their user accounts. Instead, a service provider system may implement automated processes to retrieve updated user data from the decentralized distributed ledger 104 and accordingly update corresponding user accounts using this updated user data, thereby reducing the amount of compute resources required by the service provider system.

In some instances, a user 112 may submit a request to add one or more service provider systems to their distribution list without updating their user data. In response to the request, the identity management system 102 may evaluate the updated distribution list to identify the one or more service provider systems added to the distribution list. For each of these added service provider systems, the identity management system 102 may determine whether the added service provider system has been onboarded by the identity management system 102 for distribution of user data through the decentralized distributed ledger 104. As noted above, during an onboarding process for a service provider system, the identity management system 102 may provision a unique cryptocontract that, when executed, generates a unique cryptographic key pair associated with the service provider system. This cryptographic key pair may be required to encrypt messages including public cryptographic keys associated with the user 112 for delivery to the service provider system. If an added service provider system has not been previously onboarded by the identity management system, the identity management system 102 may transmit a notification to the service provider system to initiate the onboarding process, as described above.

If the identity management system 102 maintains, for an added service provider system, a system-specific cryptographic key pair, the identity management system 102 may automatically use the private cryptographic key from this system-specific cryptographic key pair to encrypt a new message for the added service provider system. This new message may include the unique identifier corresponding to the added service provider system and the public cryptographic key 110 generated using the cryptocontract deployed by the identity management system 102 within the decentralized distributed ledger 104. The public cryptographic key 110 may correspond to the most recent user data maintained within the decentralized distributed ledger 104. Thus, when a service provider system is added to the distribution list for the user data, the cryptocontract may only be required to generate a new message for the added service provider system as the other service provider systems included in the distribution list may have previously been provided with the public cryptographic key 110.

In some instances, the user 112 may remove one or more service provider systems from their distribution list such that these one or more service provider systems may no longer receive updated user data associated with the user 112. For instance, the user 112 may submit a request to the identity management system 102 to remove one or more service provider systems from their distribution list. As another example, the user 112 may submit a new distribution list that does not include the unique identifiers corresponding to the one or more service provider systems that the user 112 no longer authorizes to have access to their user data. The identity management system 102 may compare this new distribution list to the most recent distribution list maintained by the identity management system 102 to detect any changes to the distribution list. Accordingly, the identity management system 102, through evaluation of the new distribution list, may identify which one or more service provider systems are no longer authorized to receive updated user data associated with the user 112.

In response to the request to remove one or more service provider systems from the user's distribution list, the identity management system 102, through the cryptocontract associated with the user data and the distribution list corresponding to the user 112, may dynamically generate a new public cryptographic key corresponding to the most recent version of the user data. Additionally, the cryptocontract may automatically generate new messages that encode this new public cryptographic key for delivery to the service provider systems still included in the user's distribution list and, thus, authorized to access the user data. As noted above, the identity management system 102 may maintain, for each service provider system, a system-specific cryptographic key pair. For each service provider system included in the updated distribution list, the cryptocontract may encrypt the message including the new public cryptographic key for the user data using the system-specific private cryptographic key from their system-specific cryptographic key pair. This encryption may be performed to prevent the removed one or more service provider systems and other unauthorized entities from accessing the new public cryptographic key corresponding to the most recent version of the user data. Thus, while these removed one or more service provider systems may maintain access to older versions of the user data, because these one or more service provider systems do not have access to the new public cryptographic key, the one or more service provider systems may not have access to any updated user data provided by the user 112 after the creation of the new cryptographic key pair.

In an embodiment, in addition to transmitting the new public cryptographic key to the service provider systems still included in the updated distribution list, the identity management system 102, through the cryptocontract, generates new messages that encode a null public cryptographic key for delivery to the removed one or more service provider systems. For instance, the identity management system 102, through the cryptocontract associated with the user data and the distribution list corresponding to the user 112, may transmit a new message to each removed service provider system that does not include the new public cryptographic key provided to the remaining authorized service provider systems. As an illustrative example, this new message may include a field corresponding to the user-specific public cryptographic field through which the cryptocontract may provide a null value (e.g., "public_key_for_user"="NULL"). This null value may serve as an indication that the new message does not include a public cryptographic key usable to retrieve and decrypt the most recent version of the user data from the decentralized distributed ledger 104. While the new message may no longer include a public cryptographic key associated with the encrypted user data 108, the new message may still be encrypted using the system-specific private cryptographic key associated with the removed service provider system such that no other service provider system or other unauthorized entity may determine that the removed service provider system is no longer authorized to access the user data.

In some instances, a service provider system removed from the distribution list defined by the user 112 for their updated user data may still have access to outdated user data through the decentralized distributed ledger 104. For instance, a service provider system that is not authorized to access the updated user data through the decentralized distributed ledger 104 may use a previously provided public cryptographic key corresponding to an older version of the user data to decrypt this older version of the user data from the decentralized distributed ledger 104. However, this older version of the user data may be outdated and, thus, may not represent the up-to-date user data that the user 112 has opted to distribute to authorized service provider systems through the decentralized distributed ledger 104.

It should be noted that the user cryptographic key pair generated by the cryptocontract deployed by the identity management system 102 is not stored within any datastore or repository implemented by the identity management system 102, as the user cryptographic key pair is automatically provided to the user 112 upon generation (such as through the user's digital wallet described above). This may prevent inadvertent exposure of the user cryptographic key pair to any entities accessing the identity management system 102 outside of the decentralized distributed ledger 104, thereby enhancing the security of the identity management system 102.

Figure 2:
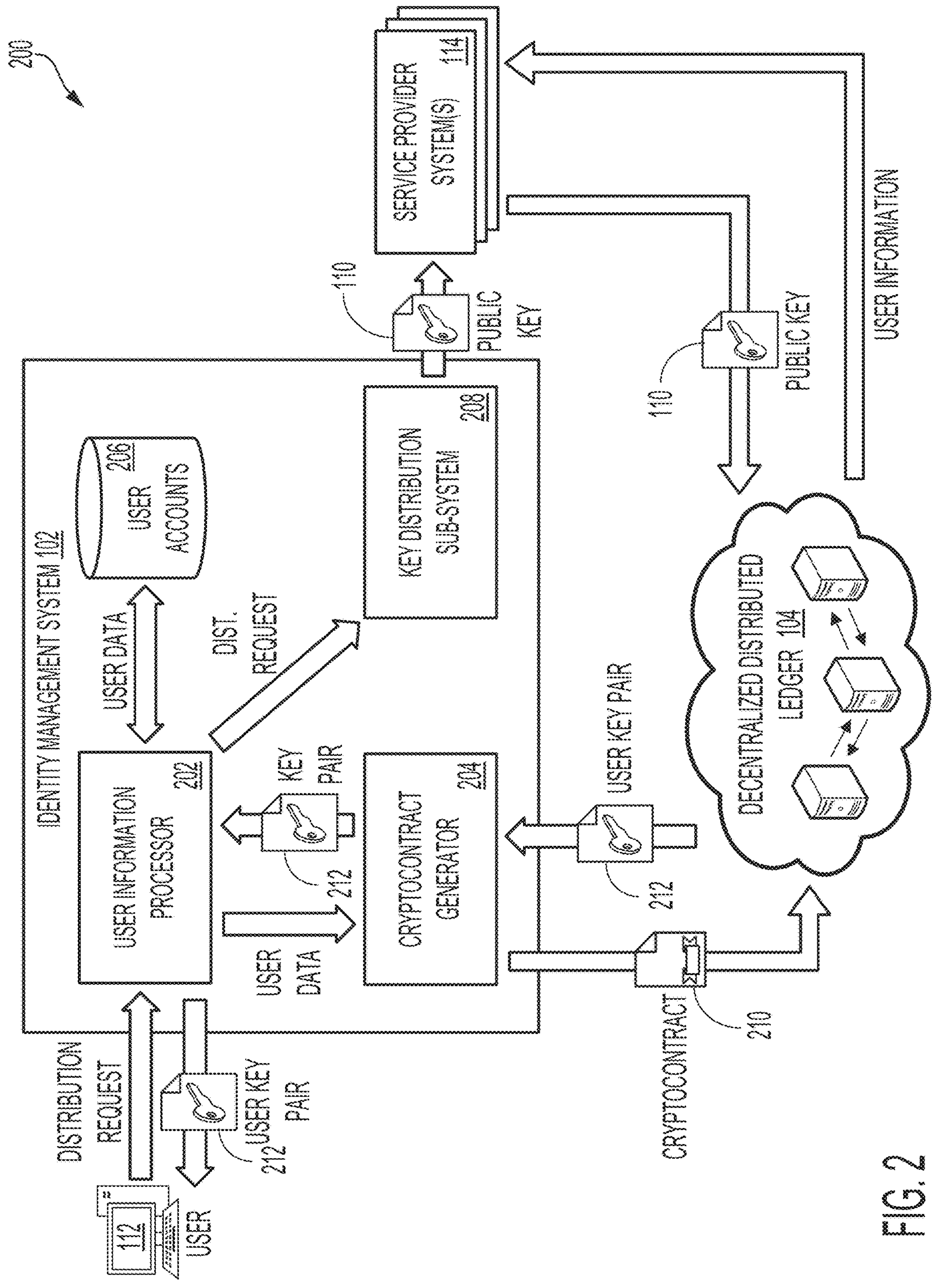
FIG. 2 shows an illustrative example of an environment in which an identity management system generates, through a cryptocontract implemented in a decentralized distributed ledger, a cryptographic key pair for encryption and distribution of user data in accordance with at least one embodiment.

FIG. 2 shows an illustrative example of an environment 200 in which an identity management system 102 generates, through a cryptocontract 210 implemented in a decentralized distributed ledger 104, a cryptographic key pair 212 for encryption and distribution of user data in accordance with at least one embodiment. In the environment 200, a user 112 associated with the identity management system 102 may transmit a distribution request to a user information processor 202 implemented by the identity management system 102. The user information processor 202 may be implemented on a computer system or other system (e.g., server, virtual machine instance, etc.) associated with the identity management system 102. Alternatively, the user information processor 202 may be implemented as an application or other executable process executed on one or more computer systems associated with the identity management system 102.

In an embodiment, the user information processor 202 can process incoming requests from users to define a distribution list that can be used to automatically distribute user data corresponding to these users to selected service provider systems. For instance, the user information processor 202 may provide a GUI through which a user 112 may submit an initial onboarding request to allow the user 112 to define an initial distribution list corresponding to different service provider systems 114 authorized by the user 112 to receive user data, as well as what user data is to be automatically shared with these different service provider systems 114. As part of this onboarding process performed by the user information processor 202, the user 112 may be prompted to provide a set of credentials or other information that may be used to authenticate the user 112 (e.g., username and password, one-time password, cryptographic token, etc.).

If the user information processor 202 successfully authenticates the user 112, the user information processor 202 may query a user accounts datastore 206 to retrieve user data associated with the user 112 and maintained by the identity management system 102. As noted above, the identity management system 102 may be associated with different payment instrument services, financial institutions, and/or other entities through which the user 112 may maintain one or more existing accounts. As an illustrative example, the identity management system 102 may be associated with a payment instrument service, through which the user 112 may maintain one or more payment instrument accounts. Each of these one or more payment instrument accounts may include different user data that may be used by different service provider systems 114 for different purposes. For example, a payment instrument account may include the name of the user 112, the geographic address of the user 112, an electronic mail address of the user 112, a Primary Account Number (PAN) or other account number associated with the account, user PII, and the like. The identity management system 102, through the user accounts datastore 206, may maintain entries corresponding to the different accounts maintained by the one or more services and/or other entities that may be associated with the identity management system 102.

In some instances, the identity management system 102 may be a standalone system that is not associated with any other entity. For example, the identity management system 102 may be implemented to allow users to define user data (which can be stored in the user accounts datastore 206) and select one or more service provider systems and other entities to which the users may wish to disseminate the user data to. Thus, the identity management system 102 may be implemented as a standalone service through which user data may be maintained and automatically distributed through a decentralized distributed ledger 104 according to provided distribution lists.

The user information processor 202, through the GUI provided to the user 112, may present the user data obtained from the user accounts datastore 206 and corresponding to the user 112. The user 112 may evaluate the presented user data and select what user data the user 112 would like to distribute to one or more service provider systems 114 and/or other entities through the decentralized distributed ledger 104. For instance, from the available user data maintained in the user accounts datastore 206, the user 112 may opt to distribute their electronic mail address to one or more service provider systems 114 and/or other entities. In some instances, through the GUI, the user information processor 202 may allow the user 112 to update any of their available user data. For instance, if the user 112 is moving to a new location, the user 112 may wish to update their user data to indicate their new geographic address. As another illustrative example, if the user 112 has received a new payment instrument for an existing payment instrument account, whereby the payment instrument has a new PAN or other account number associated with it, the user 112 may wish to update their user data to indicate this new PAN or other account number. Through the GUI, the user information processor 202 may provide the user 112 with an indication of what user data is maintained by the identity management system 102 and that has been provided to different service provider systems 114 and/or other entities. This may allow the user 112 to readily determine what user data needs to be updated and disseminated to selected service provider systems 114 and/or other entities without needing to access these service provider systems 114 and/or other entities individually.

In an embodiment, the user information processor 202, through the GUI, further allows the user 112 to define one or more distribution lists for distribution of the selected user data. For instance, the user information processor 202 may provide the user 112 with a listing or other ordering of the service provider systems 114 and/or other entities that are associated with the identity management system 102. As noted above, for a service provider system to receive user data associated with users from the decentralized distributed ledger 104, the service provider system may need to transmit a request to the identity management system 102 to join the decentralized distributed ledger 104. The request may include a unique identifier corresponding to the service provider system. The unique identifier may correspond to a foreign identifier used by the service provider system to identify their users within the service provider system ecosystem. In response to the onboarding request from the service provider system, the identity management system 102 may perform a vetting process to ensure that the service provider system is not a malicious entity and that the service provider system provides legitimate services to users.

The user information processor 202, through the GUI, may present the user 112 with the unique identifiers corresponding to the service provider systems 114 and/or other entities that have been vetted by the identity management system 102 and, accordingly, maintain nodes within the decentralized distributed ledger 104. As noted above, the identity management system 102 may maintain a node within the decentralized distributed ledger 104 that can automatically transmit messages to the nodes associated with different service provider systems 114 and/or other entities to distribute user data associated with different users. A node corresponding to a particular service provider system or other entity may be associated with the unique identifier corresponding to this particular service provider system or other entity. Thus, when a user 112 adds, through the GUI, a unique identifier corresponding to a particular service provider system or other entity, the user 112 is authorizing the identity management system 102 to transmit a message, through the decentralized distributed ledger 104, to the node associated with the particular service provider system or other entity to enable access to the selected user data.

In an embodiment, the user information processor 202 allows the user 112 to define any number of different distribution lists for distribution of different sets of user data to corresponding service provider systems 114 and/or other entities. For instance, through the GUI provided by the user information processor 202, the user 112 may define a distribution list corresponding to a first set of service provider systems that may receive the user's updated electronic mail address. By virtue of being included in this distribution list, this first set of service provider systems may be authorized by the user 112 to receive the user's updated electronic mail address. Through the GUI, the user 112 may additionally define a different distribution list corresponding to a second set of service provider systems that may receive the user's updated electronic mail address, geographic address, and PAN associated with a particular payment instrument account. This second set of service provider systems may thus be authorized to receive the updated electronic mail address, geographic address, and PAN associated with the particular payment instrument account. However, any service provider systems included in the first distribution list but not in the second distribution list are unable to receive the updated geographic address and PAN associated with the particular payment instrument account. Thus, through different distribution lists, the user 112 may define what user data is to be distributed to the service provider systems indicated in these different distribution lists. Through this customization of distribution lists for different sets of user data, the user 112 may control how their user data is disseminated to different service provider systems 114 and/or other entities without needing to access each of these different service provider systems 114 and/or other entities to determine what information is maintained therein and make individual modifications to the user data maintained therein.

In an embodiment, the user information processor 202 transmits the distribution list and the user data that is to be recorded in the decentralized distributed ledger 104 to a cryptocontract generator 204 implemented by the identity management system 102. The cryptocontract generator 204 may be implemented on a computer system or other system (e.g., server, virtual machine instance, etc.) associated with the identity management system 102. Alternatively, the cryptocontract generator 204 may be implemented as an application or other executable process executed on one or more computer systems associated with the identity management system 102. The cryptocontract generator 204, in response to receiving the user data and corresponding distribution list associated with the user's distribution request, may determine whether there is an existing cryptocontract corresponding to the user data deployed within the decentralized distributed ledger 104. As noted above, a cryptocontract may be deployed within the decentralized distributed ledger 104 to automatically encrypt user data and to record the encrypted user data within the decentralized distributed ledger 104.

When the user 112 submits a distribution request for the first time to the identity management system 102 (such as during an onboarding process with the identity management system 102), the cryptocontract generator 204 may automatically determine that a cryptocontract 210 corresponding to the user data maintained in the user accounts datastore 206 has not been generated and deployed to the decentralized distributed ledger 104. Accordingly, in an embodiment, the cryptocontract generator 204 generates a new cryptocontract 210 corresponding to the user data that is to be distributed to the set of service provider systems 114 indicated in the provided distribution list. The cryptocontract 210, in an embodiment, includes a collection of programmatic code that, when executed, causes the cryptocontract 210 to automatically generate a user-specific cryptographic key pair 212 associated with the user 112 and the user data that is to be encrypted using the user-specific cryptographic key pair 212. The user-specific cryptographic key pair 212 may be unique to the particular user data being recorded in the decentralized distributed ledger 104. For instance, if the user 112 submits a distribution request for the distribution of their updated electronic mail address, the cryptocontract 210 may automatically generate a user-specific cryptographic key pair 212 corresponding to the updated electronic mail address. If the user 112, at a later time, submits a distribution request for the distribution of their updated electronic mail address and of their updated geographic address, the cryptocontract 210 may generate a new user-specific cryptographic key pair corresponding to the updated electronic mail address and updated geographic address. Thus, the cryptocontract 210, for a particular user 112, may generate different user-specific cryptographic key pairs 212 according to the user data being distributed through the decentralized distributed ledger 104.

In an embodiment, the cryptocontract generator 204 deploys the cryptocontract 210 to the decentralized distributed ledger 104 through a node implemented within the decentralized network and associated with the identity management system 102. This node, as noted above, may automatically execute the cryptocontract 210 associated with the user 112 and their corresponding user data to automatically generate the aforementioned cryptographic key pair 212. Further, the cryptocontract 210 may automatically use the private cryptographic key from the cryptographic key pair 212 to encrypt the provided user data. The cryptocontract 210 may additionally record the encrypted user data in the decentralized distributed ledger 104 for distribution to different service provider systems and other entities according to user-provided distribution lists.

In an embodiment, the cryptocontract 210 provides the newly generated cryptographic key pair 212 to the user 112 through the cryptocontract generator 204 and the user information processor 202. For instance, if the user 112 maintains a digital wallet for the storage of different cryptographic keys associated with different decentralized distributed ledgers (including decentralized distributed ledger 104), the user information processor 202 may automatically add the cryptographic key pair 212 to this digital wallet via the decentralized distributed ledger 104. In some instances, the user information processor 202 may dynamically provision a new digital wallet for the user 112 during the aforementioned user onboarding process and, accordingly, provide a record corresponding to the generation of this digital wallet in the decentralized distributed ledger 104. Alternatively, if the user 112 has designated a particular digital wallet for use in storing cryptographic keys, the user information processor 202 may add the cryptographic key pair 212 to this particular digital wallet. In some examples, the cryptocontract 210 can be programmed to automatically add the cryptographic key pair 212 to a designated digital wallet without further intervention from the cryptocontract generator 204 or the user information processor 202.

In an embodiment, the user information processor 202, through a key distribution sub-system 208 implemented by the identity management system 102, provides a public cryptographic key 110 corresponding to the user-specific cryptographic key pair 212 to the service provider systems 114 indicated in the distribution list provided by the user 112 in their distribution request. As noted above, a service provider system may be authorized to provision and deploy a node within the decentralized network associated with the decentralized distributed ledger 104 during an onboarding process with the identity management system 102. Through this onboarding process, the cryptocontract generator 204 may deploy, through the node associated with the identity management system 102 in the decentralized network, a cryptocontract corresponding to the service provider system. This new cryptocontract, when executed by the node associated with the identity management system 102, may generate a cryptographic key pair specific to the node associated with the service provider system being onboarded. The cryptographic key pair associated with the service provider system may be used to encrypt messages transmitted by the key distribution sub-system 208 (through the node associated with the identity management system 102) to the corresponding service provider system through the decentralized distributed ledger 104. The public cryptographic key associated with this cryptographic key pair may be provided to the service provider system to allow the service provider system to decrypt any messages from the key distribution sub-system 208.

In response to the distribution request, and after providing the user-specific cryptographic key pair 212 to the user 112, the user information processor 202 may encrypt the user data that is to be distributed to the selected service provider systems 114 (as indicated in the provided distribution list or otherwise selected by the user 112) using the private cryptographic key from the user-specific cryptographic key pair 212. Further, the user information processor 202, through the node associated with the identity management system 102 and implemented in the decentralized network associated with the decentralized distributed ledger 104, may record the encrypted user data in the decentralized distributed ledger 104.

In an embodiment, once the encrypted user data has been recorded in the decentralized distributed ledger 104, the key distribution sub-system 208 may automatically generate new messages that include the user-specific public cryptographic key 110 corresponding to the cryptographic key pair 212 provided to the user 112 and usable to decrypt the user data encrypted using the user-specific private cryptographic key and recorded in the decentralized distributed ledger 104. For a given service provider system authorized to receive the user data from the decentralized distributed ledger 104, the key distribution sub-system 208 may generate a message that includes a unique identifier corresponding to the service provider system and the public cryptographic key 110. Further, the key distribution sub-system 208 may encrypt the new message using the private cryptographic key associated with the given service provider system such that only the given service provider system, using its public cryptographic key, may decrypt the message and obtain the user-specific public cryptographic key 110. Using the user-specific public cryptographic key 110, the service provider system may decrypt the user data from the decentralized distributed ledger 104.

It should be noted that the processes described above in connection with FIG. 2 may be performed for different users as the distribution requests from these different users are received. For instance, as the key distribution sub-system 208 automatically generates new messages for service provider systems 114 authorized to obtain and decrypt user data corresponding to a first user and from the decentralized distributed ledger 104, the user information processor 202 may begin to process a newly received distribution request from a second user for distribution of user data to another set of service provider systems through the decentralized distributed ledger 104. Thus, the identity management system 102 may continuously, and simultaneously, process different distribution requests from different users as these distribution requests are received. This may further result in the continuous generation of new cryptocontracts for different sets of user data and corresponding users, the continuous dissemination of messages to different service provider systems 114 to enable these different service provider systems 114 to obtain the user data from the decentralized distributed ledger 104, and the continuous generation of cryptographic keys for the secure encryption of different user data for recordation in the decentralized distributed ledger 104. Furthermore, because the cryptocontract generator 204 generates a unique cryptocontract for each user and corresponding user data, the cryptographic key pairs generated by each unique cryptocontract is unique to each user. This may prevent exposure of user data associated with a particular user to other users of the identity management system 102 as these different distribution requests are continuously and simultaneously processed.

Figure 3:
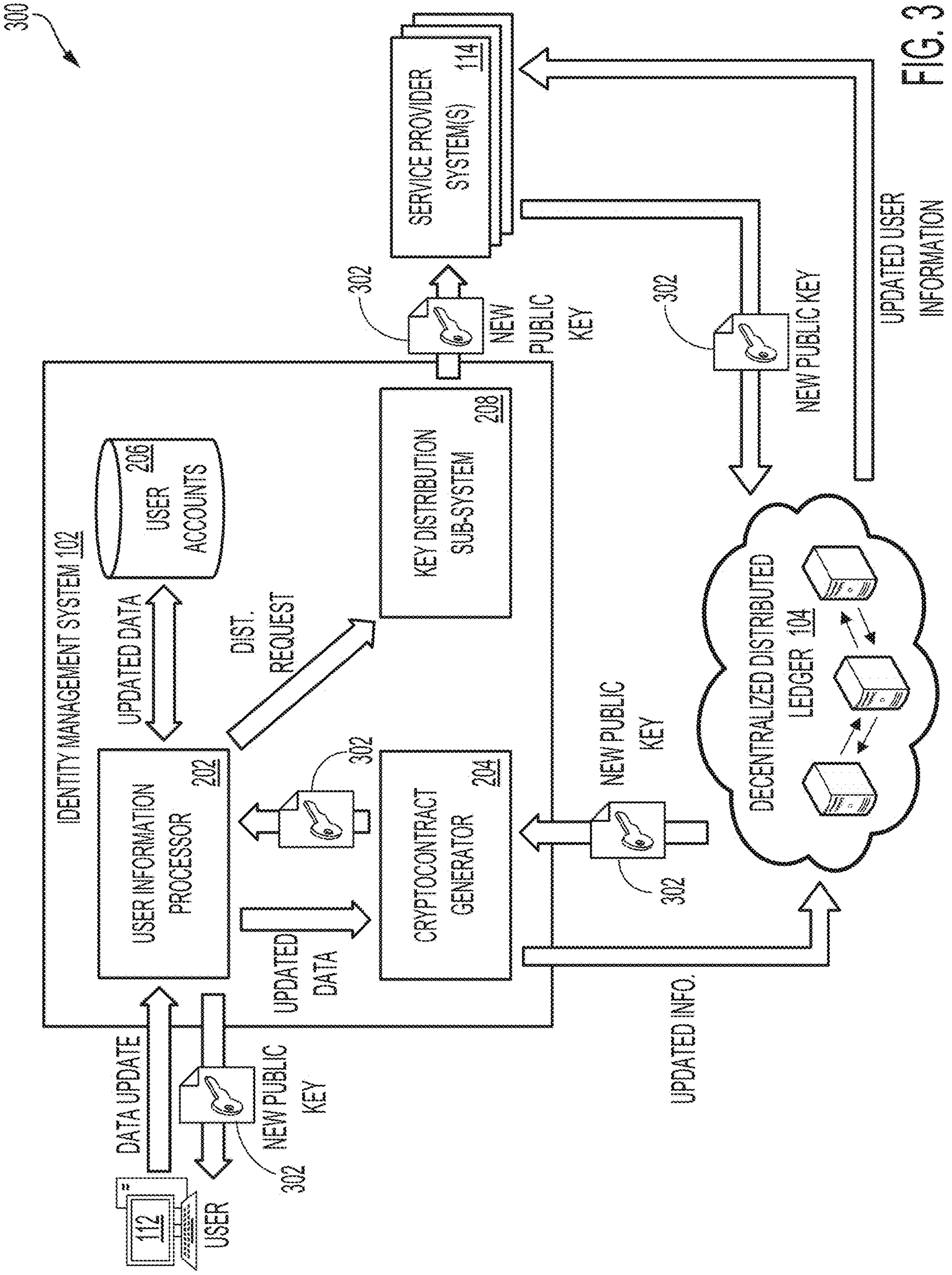
FIG. 3 shows an illustrative example of an environment in which an identity management system generates, through a cryptocontract implemented in a decentralized distributed ledger, a new public cryptographic key in response to receiving updated user data in accordance with at least one embodiment.

As noted above, the user 112, in some instances, may submit a request to the user information processor 202 to update the distribution list for previously provided user data or to update the user data that is to be provided to service provider systems 114 indicated in an existing distribution list. In these instances, the user 112 may have an existing private cryptographic key previously provided by the identity management system 102, as described above. FIG. 3 shows an illustrative example of an environment 300 in which an identity management system 102 generates, through a cryptocontract implemented in a decentralized distributed ledger 104, a new public cryptographic key 302 in response to receiving updated user data in accordance with at least one embodiment.

In the environment 300, the user 112 may transmit a request to update their user data within the user accounts datastore 206. For instance, the user 112 may wish to update their geographic (i.e., mailing) address as a result of a recent move to a new address. As another illustrative example, the user 112 may wish to update their payment instrument information corresponding to a preferred payment instrument for use in automatic payments to different service provider systems 114. Through the request, the user 112 may further identify one or more service provider systems 114 to which the updated user data is to be provided. As noted above, through a GUI implemented by the user information processor 202, the user 112 may define a distribution list that includes unique identifiers corresponding to the different service provider systems to which the user 112 would like to distribute the user data. This distribution list may be updated by the user 112 at any time such that, through this distribution list, the user 112 may authorize and deauthorize access by different service provider systems 114 to the user data through the decentralized distributed ledger 104. Accordingly, through the user information processor 202, the user 114 may modify or define a distribution list corresponding to service provider systems 114 that the user 112 is authorizing to receive the updated user data.

In an embodiment, if the user 112 has provided updated user data that is to be distributed to a set of service provider systems 114 according to the distribution list defined by the user 112, the user information processor 202 can update an entry in the user accounts datastore 206 to provide an association between this updated user data and the distribution list. The user information processor 202 may maintain, within the user accounts datastore 206, different entries corresponding to different users and different iterations of their user data. For instance, a user 112, through the user accounts datastore 206, may maintain an entry corresponding to a particular set of data that the user 112 maintains for a particular set of service provider systems 114. Simultaneously, the user 112, through the user accounts datastore 206, may maintain a different entry corresponding to different data that the user 112 may maintain for a different set of service provider systems 114.

Each entry within the user accounts datastore 206 may further include a particular distribution list that specifies the service provider systems 114 that are authorized to obtain the user data included in the entry. As noted above, the user information processor 202 may provide a GUI through which a user 112 may select different service provider systems 114 to which the provided user data may be distributed. For instance, through the GUI, the user information processor 202 may present the user 112 with the unique identifiers corresponding to the service provider systems 114 and/or other entities that have been vetted by the identity management system 102 and maintain nodes within the decentralized distributed ledger 104. A node corresponding to a particular service provider system or other entity may be associated with the unique identifier corresponding to this particular service provider system or other entity. Thus, when a user 112 adds, through the GUI, a unique identifier corresponding to a particular service provider system or other entity, the user 112 is authorizing the identity management system 102 to transmit a message, through the decentralized distributed ledger 104, to the node associated with the particular service provider system or other entity to enable access to the selected user data.

In an embodiment, in response to the request from the user 112 to distribute the updated user data to one or more service provider systems 114, the user information processor 202 provides the updated user data to the cryptocontract generator 204 for encryption and recording in the decentralized distributed ledger 104. As noted above, in their request to distribute updated user data, the user 112 may provide a user-specific private cryptographic key 106. For instance, if the user 112 maintains the user-specific cryptographic key 106 in their digital wallet, the user 112 may transmit the user-specific private cryptographic key from their digital wallet to the node associated with the identity management system 102 in the decentralized network. Alternatively, the user 112 may provide their user-specific private cryptographic key to the user information processor 202, which may transmit the user-specific private cryptographic key to the cryptocontract generator 204. However, at no point is the user-specific private cryptographic key persistently stored by the identity management system 102. This may prevent inadvertent exposure of the user-specific private cryptographic key to unauthorized entities, thereby enhancing the security of the identity management system 102.

In an embodiment, the cryptocontract generator 204 obtains, from the node associated with the identity management system 102, the user-specific private cryptographic key and encrypts the updated user data. Additionally, the cryptocontract generator 204 may obtain a new user-specific public cryptographic key 302 that may be used to decrypt the encrypted user data from the decentralized distributed ledger 104. For instance, upon encrypting the updated user data using the user-specific private cryptographic key, the cryptocontract generator 204 may execute the cryptocontract associated with the user 112 and their corresponding user data to record the encrypted user data in the decentralized distributed ledger 104. The cryptocontract, in an embodiment, further generates a new user-specific public cryptographic key 110 corresponding to the encrypted user data. As the encrypted user data may incorporate updated user data, a new user-specific public cryptographic key may need to be generated to allow for decryption of the encrypted user data.

In some instances, in response to receiving updated user data, the cryptocontract generator 204 may automatically deploy a new cryptocontract that, when executed, automatically encrypts the updated user data and records the updated user data in encrypted form within the decentralized distributed ledger 104. The new cryptocontract, in an embodiment, generates a new user-specific cryptographic key pair that is used to encrypt the updated user data for recording in the decentralized distributed ledger 104. The cryptocontract, through the node implemented by the identity management system 102 in the decentralized network, may return the new user-specific cryptographic key pair to the user information processor 202 for distribution to the user 112. Since the updated user data is encrypted using a new private cryptographic key, service provider systems 114 may no longer be able to utilize a previously provided public cryptographic key to decrypt the updated user data from the decentralized distributed ledger 104. Thus, through the creation of new user-specific cryptographic key pairs, the identity management system 102 may automatically control the dissemination of user data as this user data is updated by the user 112 and according to the distribution parameters defined by the user 112 in their request to disseminate the updated user data to selected service provider systems 114.

In an embodiment, regardless of whether a new public cryptographic key 302 is defined by an existing cryptocontract associated with the user data or a new cryptocontract is deployed for the updated user data, the key distribution sub-system 208 may distribute the new public cryptographic key 302 corresponding to the updated user data to the service provider systems 114 authorized by the user 112 to receive the updated user data. For instance, the key distribution sub-system 208 may receive, from the user information processor 202, the distribution list defined by the user 112 for the updated user data. In response to receiving the distribution list for the updated user data, the key distribution sub-system 208, through the node implemented by the identity management system 102 may transmit a message to each service provider system specified in the distribution list to provide the user-specific public cryptographic key 110 corresponding to the updated user data.

As noted above, in order for a service provider system to access the decentralized network maintained by the identity management system 102 and to accordingly receive messages from the node associated with the identity management system 102, the service provider system may need to be vetted by the identity management system 102. If the service provider system is successfully vetted by the identity management system 102, the identity management system 102 may authorize the service provider system to provision and deploy their own node within the decentralized network. Further, the identity management system 102 may deploy, through its node, a new cryptocontract corresponding to the particular service provider system. This new cryptocontract, when executed, may automatically generate a cryptographic key pair specific to the node associated with the service provider system. This cryptographic key pair may be used to encrypt messages transmitted by the identity management system 102 to the service provider system through the decentralized distributed ledger 104. The public cryptographic key associated with this cryptographic key pair may be provided to the service provider system to allow the service provider system to decrypt any messages from the identity management system 102.

In an embodiment, the key distribution sub-system 208, for each service provider system indicated in the received distribution list, uses the private cryptographic key corresponding to the service provider system to encrypt the new message containing the unique identifier of the service provider system and the new public cryptographic key 302. The key distribution sub-system 208, through the node associated with the identity management system 102 implemented in the decentralized network, may transmit the encrypted message to the service provider system. By encrypting each message using the private cryptographic key corresponding to the recipient service provider system, the key distribution sub-system 208 may prevent inadvertent exposure of the new public cryptographic key 302 to service provider systems not included in the distribution list and to any other entity otherwise not authorized to access the updated user data.

In response to receiving the encrypted message from the node associated with the identity management system 102, a service provider system may use its public cryptographic key to decrypt the encrypted message. The service provider system may obtain, from the decrypted message, the new public cryptographic key 302 and the unique identifier associated with the service provider system. In response to the message, the service provider system may further access the decentralized distributed ledger 104 to retrieve the encrypted user data corresponding to the updated user data provided by the user 112. The service provider system may use the obtained public cryptographic key 302 to decrypt the updated user data from the decentralized distributed ledger 104.

As noted above, the identity management system 102 may further generate a new public cryptographic key 302 for distribution to selected service provider systems 114 when the user 112 submits a request to the user information processor 202 to update an existing distribution list for particular user data. For instance, the user 112 may determine that a particular service provider system is not to receive any further user data corresponding to the user 112. Alternatively, the user 112 may wish to add one or more service provider systems to the user's distribution list to authorize these one or more service provider systems to access the user data associated with the user 112.

In response to the request to update an existing distribution list associated with the user 112, the user information processor 202 may compare the updated distribution list to the previous version of the distribution list maintained in the user accounts datastore 206 for particular user data to detect the changes to the distribution list (e.g., addition of new service provider systems and/or removal of existing service provider systems, etc.). In an embodiment, if the user 112 has removed one or more service provider systems from the distribution list for particular user data, the user information processor 202 may transmit a request to the cryptocontract generator 204 to generate a new user-specific public cryptographic key 302 for the user data. In response to the request, the cryptocontract generator 204 may execute, from the node associated with the identity management system 102 in the decentralized network, the cryptocontract associated with the user data to dynamically generate the new user-specific public cryptographic key 302 for the user data. Additionally, the key distribution sub-system 208, through the cryptocontract, may automatically generate new messages that encode this new public cryptographic key 302 for delivery to the service provider systems still included in the user's distribution list and, thus, authorized to access the user data. These new messages may be encrypted using the system-specific private cryptographic keys corresponding to the service provider systems indicated in the updated distribution list.

In addition to transmitting new messages to the service provider systems included in the distribution list to provide the new user-specific public cryptographic key 302 for the encrypted user data, the key distribution sub-system 208, through the cryptocontract deployed to the decentralized distributed ledger 104 for the user data, may generate new messages that encode a null public cryptographic key for delivery to the removed one or more service provider systems. For instance, the key distribution sub-system 208, through this cryptocontract, may transmit a new message to each removed service provider system that does not include the new user-specific public cryptographic key 302 provided to the service provider systems indicated in the updated distribution list. This new message, in some instances, may include a user-specific public cryptographic field through which the cryptocontract may provide a null value. This null value may serve as an indication that the new message does not include a public cryptographic key usable to retrieve and decrypt the most recent version of the user data from the decentralized distributed ledger 104. While the new message may no longer include a public cryptographic key associated with the encrypted user data 108, the new message may still be encrypted using the system-specific private cryptographic key associated with the removed service provider system.

In an embodiment, if the user 112 submits an updated distribution list that includes one or more new service provider systems that the user 112 wishes to share existing user data with, the user information processor 202 can determine whether the newly added service provider systems have been onboarded by the identity management system 102 for distribution of user data through the decentralized distributed ledger 104. As noted above, during an onboarding process for a service provider system, the cryptocontract generator 204 may provision a unique cryptocontract for the service provider system that, when executed, generates a unique cryptographic key pair associated with the service provider system. This system-specific cryptographic key pair may be required to encrypt messages including user-specific public cryptographic keys associated with the user 112 for delivery to the service provider system. If an added service provider system has not been previously onboarded by the identity management system, the identity management system 102 may transmit a notification to the service provider system to initiate the onboarding process, as described above.

If a system-specific cryptographic key pair for an added service provider system is available (such as through a digital wallet associated with the added service provider system), the key distribution sub-system 208, through the cryptocontract associated with the user data, may automatically use the private cryptographic key from this system-specific cryptographic key pair to encrypt a new message for the added service provider system. This new message may include the unique identifier corresponding to the added service provider system and the user-specific public cryptographic key 302 generated using the cryptocontract deployed by the identity management system 102 within the decentralized distributed ledger 104. The user-specific public cryptographic key 302 may correspond to the most recent user data maintained within the decentralized distributed ledger 104. Thus, when a service provider system is added to the distribution list for the user data, the cryptocontract may only be required to generate a new message for the added service provider system as the other service provider systems included in the distribution list may have previously been provided with the public cryptographic key 302 corresponding to the existing user data associated with the user 112.

Figure 4:
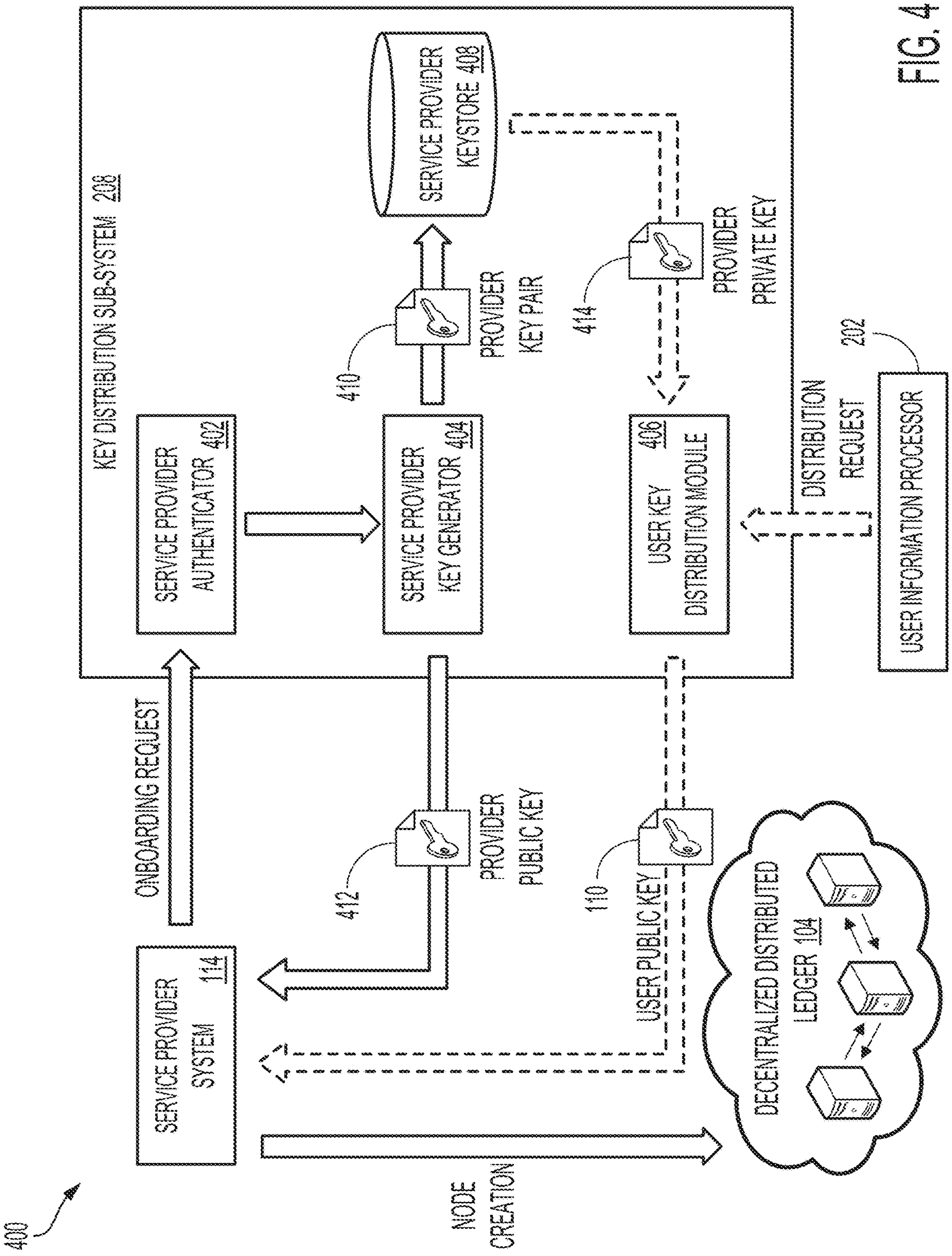
FIG. 4 shows an illustrative example of an environment in which a key distribution sub-system associated with an identity management system processes an onboarding request corresponding to a service provider system in accordance with at least one embodiment.

FIG. 4 shows an illustrative example of an environment 400 in which a key distribution sub-system 208 associated with an identity management system processes an onboarding request corresponding to a service provider system in accordance with at least one embodiment. In the environment 400, a service provider system 114 may transmit an onboarding request to a service provider authenticator 402 associated with the key distribution sub-system 208. A service provider system 114 may submit an onboarding request to the service provider authenticator 402 in order to automatically obtain any user data updates from different users that may be associated with the identity management system and the service provider system 114. For instance, the service provider system 114 may maintain an account associated with the user and corresponding to services provided by the service provider system 114. The user may further maintain an account with the identity management system whereby the user may provide data that may be of use to the service provider system 114 in maintaining the user's account (e.g., payment information, electronic mail addresses, geographic addresses, etc.).

The onboarding request from the service provider system 114 may include a unique identifier corresponding to the service provider system 114. The unique identifier may be a foreign identifier used by the service provider system 114 to identify their users within the service provider system ecosystem. As noted above, this foreign identifier may be included in messages transmitted to the service provider system 114 to allow the service provider system 114 to verify that an included user-specific public cryptographic key (or null key if removed from a distribution list) was correctly provided to the service provider system 114 by the key distribution sub-system 208.

In an embodiment, the service provider authenticator 402, in response to the onboarding request from the service provider system 114, may automatically perform a vetting process to ensure that the service provider system 114 is not a malicious entity and that the service provider system 114 provides legitimate services to users. For instance, the service provider authenticator 402 may request, from the service provider system 114, a set of credentials or other information that may be authenticated by the identity management system or an authorized third-party entity. If the service provider authenticator 402 is unable to authenticate the service provider system 114 (e.g., the set of credentials or other information provided is invalid, the service provider system 114 has failed to provide sufficient information needed for authentication, etc.), the service provider authenticator 402 may reject the onboarding request from the service provider system 114.

If the service provider authenticator 402 successfully authenticates the service provider system 114, the service provider authenticator 402 may approve the onboarding request. The service provider authenticator 402 may transmit a response to the service provider system 114 to indicate that the service provider system 114 is authorized to provision and deploy their own node within the decentralized distributed ledger 104. This new node may allow the service provider system 114 to dynamically communicate with other nodes within the decentralized network and to access the decentralized distributed ledger 104 to obtain user data corresponding to users that have authorized the service provider system 114 to access the user data. As a service provider system 114 is required to maintain a node within the decentralized distributed ledger 104 in order to access user data associated with different users, the onboarding process implemented by the key distribution sub-system 208 enhances the security of the identity management system and of the decentralized distributed ledger 104 as only authenticated service provider systems 114 are provided with access to the decentralized distributed ledger 104 and, hence, user data (subject to further user authorization through the definition of distribution lists, as described herein).

Once the service provider system 114 has provisioned a new node within the decentralized network, the service provider authenticator 402 may pass a request to a service provider key generator 404 to provision a new system-specific cryptographic key pair 410 for the service provider system 114. In response to the request, the service provider key generator 404 may deploy, through the node associated with the identity management system, a cryptocontract corresponding to the service provider system 114. This cryptocontract, when executed through the node associated with the identity management system, may automatically generate a new cryptographic key pair 410 that is uniquely associated with the service provider system 114. As noted above, the system-specific cryptographic key pair 410 may be used to encrypt messages transmitted by the identity management system 102 to the service provider system through the decentralized distributed ledger 104. As these messages are encrypted with a system-specific cryptographic key pair 410, only the corresponding service provider system 114 may be able to decrypt and access the contents of these messages. This further enhances the security of the identity management system as it prevents inadvertent exposure of data that is intended solely for a service provider system 114 to other unauthorized entities (e.g., other service provider systems, malicious entities, etc.).

In an embodiment, the service provider key generator 404 may provide the public cryptographic key 412 corresponding to the newly generated cryptographic key pair 410 to the service provider system 114. For instance, the service provider key generator 404 may transmit a message directly to the service provider system 114 that encodes the system-specific public cryptographic key 412 from the newly generated cryptographic key pair 410. Alternatively, the service provider key generator 404, through the node associated with the identity management system in the decentralized network, may transmit the system-specific public cryptographic key 412 to the node associated with the service provider system 114 in the decentralized network. In some instances, the service provider key generator 404 may automatically add the system-specific public cryptographic key 412 to a digital wallet associated with the service provider system 114. For example, the service provider key generator 404 may transmit the system-specific public cryptographic key 412 to a unique address associated with the digital wallet. This unique address may be provided in the onboarding request from the service provider system 114 or in response to a request from the service provider key generator 404. In some instances, the service provider key generator 404 may dynamically provision a new digital wallet for the service provider system 114 and store the system-specific public cryptographic key 412 in this new digital wallet.

As illustrated in FIG. 4, the service provider key generator 404 may further store the system-specific cryptographic key pair 410 in a service provider keystore 408. The service provider keystore 408 may include key-value pair entries corresponding to the unique identifiers associated with different service provider systems 114 (e.g., keys) and to the system-specific cryptographic key pairs 410 generated for these different service provider systems 114 (e.g., values). In an embodiment, the key distribution sub-system 208 does not maintain a service provider keystore 408 such that the identity management system does not store system-specific cryptographic key pairs 410 associated with the different service provider systems 114 in a keystore or other database. In this embodiment, the service provider key generator 404 may provide the system-specific cryptographic key pair 410 to the corresponding service provider system 114 (such as through a message or digital wallet associated with the service provider system 114). Alternatively, the service provider key generator 404 may add the system-specific cryptographic key pair 410 to a digital wallet associated with the identity management system and maintained by the node associated with the identity management system in the decentralized network.

In an embodiment, the key distribution sub-system 208 further includes a user key distribution module 406 that is configured to provide user-specific public cryptographic keys to authorized service provider systems in response to distribution requests submitted by users. As noted above, the key distribution sub-system 208 may provide a public cryptographic key 110 corresponding to the user-specific cryptographic key pair to the service provider systems indicated in the distribution list provided by the user in their distribution request. This distribution request may be provided by the user information processor 202 in response to a user updating their user data and/or updating the distribution list corresponding to their user data (e.g., adding service provider systems to the distribution list, removing service provider systems from the distribution list, etc.).

As noted above, the identity management system may deploy, through the node associated with the identity management system in the decentralized network, a cryptocontract that when executed may automatically generate a user-specific cryptographic key pair that may be provided to a user associated with the identity management system. The private cryptographic key from this user-specific cryptographic key pair may be used to encrypt user data for recordation in the decentralized distributed ledger 104. Further, the public cryptographic key 110 from this user-specific cryptographic key pair may be provided to the service provider systems indicated in a provided distributed list for the encrypted user data and as defined by the user.

As illustrated in FIG. 4, in response to a distribution request from a user, the user key distribution module 406 may retrieve the system-specific private cryptographic key 414 from the service provider keystore 408. For instance, the user key distribution module 406 may process the distribution list provided in the distribution request to obtain the unique identifiers corresponding to the service provider systems authorized to retrieve the recorded and encrypted user data from the decentralized distributed ledger 104. Using the unique identifier corresponding to the service provider system 114, the user key distribution module 406 may query the service provider keystore 408 to determine whether the service provider keystore 408 maintains the system-specific cryptographic key pair 410 associated with the service provider system 114. If the user key distribution module 406 determines that the system-specific cryptographic key pair 410 associated with the service provider system 114 is not available within the service provider keystore 408, the user key distribution module 406 may transmit a notification to the service provider authenticator 402 to indicate that the service provider system 114 may need to be onboarded in order for a system-specific cryptographic key pair 410 to be generated for the service provider system 114. This may cause the service provider authenticator 402 to communicate with the service provider system 114 to initiate the aforementioned onboarding process. In some instances, if the service provider system 114 was previously onboarded and is still associated with the identity management system (e.g., the service provider system 114 has not been banned or otherwise removed), the user key distribution module 406 may transmit a request to the service provider key generator 404 to deploy a new cryptocontract associated with the service provider system 114 that, when executed, may automatically generate a new system-specific cryptographic key pair for the service provider system 114.

If the user key distribution module 406 obtains, in response to its query to the service provider keystore 408, the system-specific private cryptographic key 414 associated with the service provider system 114, the user key distribution module 406 may dynamically generate a new message that encodes the user-specific public cryptographic key 110 usable to decrypt the user data from the decentralized distributed ledger 104. The new message may include an identifier field through which the user key distribution module 406 may indicate the unique identifier (i.e., the foreign identifier) corresponding to the service provider system 114. This field may allow the service provider system 114 to determine that it is the rightful recipient of the message. The new message may further include a cryptographic key field through which the user key distribution module 406 may encode the user-specific public cryptographic key 110. For example, the user key distribution module 406 may include the field "public_key_for_user=g*w1g7jdksdf=@9dj" where the value for this field, "g*w1g7jdksdf=@9dj" corresponds to the user-specific public cryptographic key 110.

In an embodiment, once the user key distribution module 406 has generated the new message encoding the user-specific public cryptographic key 110, the user key distribution module 406 encrypts this new message using the system-specific private cryptographic key 414. The user key distribution module 406, through the node associated with the identity management system in the decentralized network, may transmit this encrypted message to the node associated with the service provider system 114 in the decentralized network. The service provider system 114 may use its system-specific public cryptographic key 412 to decrypt the received message and to obtain the user-specific public cryptographic key 110. Using the user-specific public cryptographic key 110, the service provider system 114 may decrypt the user data from the decentralized distributed ledger 104 and perform any corresponding actions using this user data (e.g., updating a user account to incorporate the user data, etc.).

As noted above, a user associated with the identity management system may submit a request to the user information processor 202 to remove one or more service provider systems from an existing distribution list corresponding to particular user data. In response to this request, the user key distribution module 406 may retrieve a new user-specific cryptographic key for the user data. This new user-specific cryptographic key may be generated by the cryptocontract generator (as described above in connection with FIGS. 2 and 3), which may execute, from the node associated with the identity management system in the decentralized network, the cryptocontract associated with the user data to dynamically generate the new user-specific public cryptographic key for the user data. For a service provider system still included in the distribution list, the user key distribution module 406 may generate a new message that encodes this new user-specific cryptographic key for the user data. Further, the user key distribution module 406 may encrypt the new message using the system-specific private cryptographic key 414 to encrypt this new message for delivery to the service provider system. The user key distribution module 406, through the node associated with the identity management system, may transmit this encrypted message to the node associated with the service provider system in the decentralized network.

In an embodiment, for each service provider system removed from the distribution list, the user key distribution module 406 generates a new message that does not include the new user-specific public cryptographic key provided to the service provider systems specified in the distribution list. For instance, this new message may include the field "public_key_for_user=NULL" where the value for this field, "NULL" indicates that the new message does not encode any public cryptographic keys that may be used to decrypt user data from the decentralized distributed ledger 104. Accordingly, when the service provider system receives this new message, the service provider system may be unable to decrypt the latest version of the user data recorded in the decentralized distributed ledger 104. In some instances, if the service provider system previously received a user-specific public cryptographic key corresponding to obsolete user data recorded in the decentralized distributed ledger 104, the service provider system may use this user-specific public cryptographic key to access and decrypt this obsolete user data from the decentralized distributed ledger 104.

As noted above, messages transmitted to a service provider system 114 are encrypted using a system-specific private cryptographic key so that only the intended recipient (i.e., the service provider system 114) can decrypt the message using its system-specific public cryptographic key and access the contents of the message. This may prevent any other entity (e.g., other service provider systems, unauthorized entities, etc.) from accessing the contents of the message even if they receive the message (either through error or through nefarious methods). This provides several benefits. For example, a service provider system 114 that is removed from a distribution list may be unable to access the new user-specific public cryptographic key required to decrypt user data from the decentralized distributed ledger 104 from messages transmitted to other service provider systems authorized to access the user data (e.g., service provider systems indicated in the distribution list), thereby preventing unauthorized access to the user data and enhancing security. As another illustrative example, service provider systems may be unable to determine whether other service provider systems maintain or no longer have access to user data maintained within the decentralized distributed ledger 104, thereby enhancing the privacy of the user and of the service provider systems associated with the identity management system.

Figure 5:
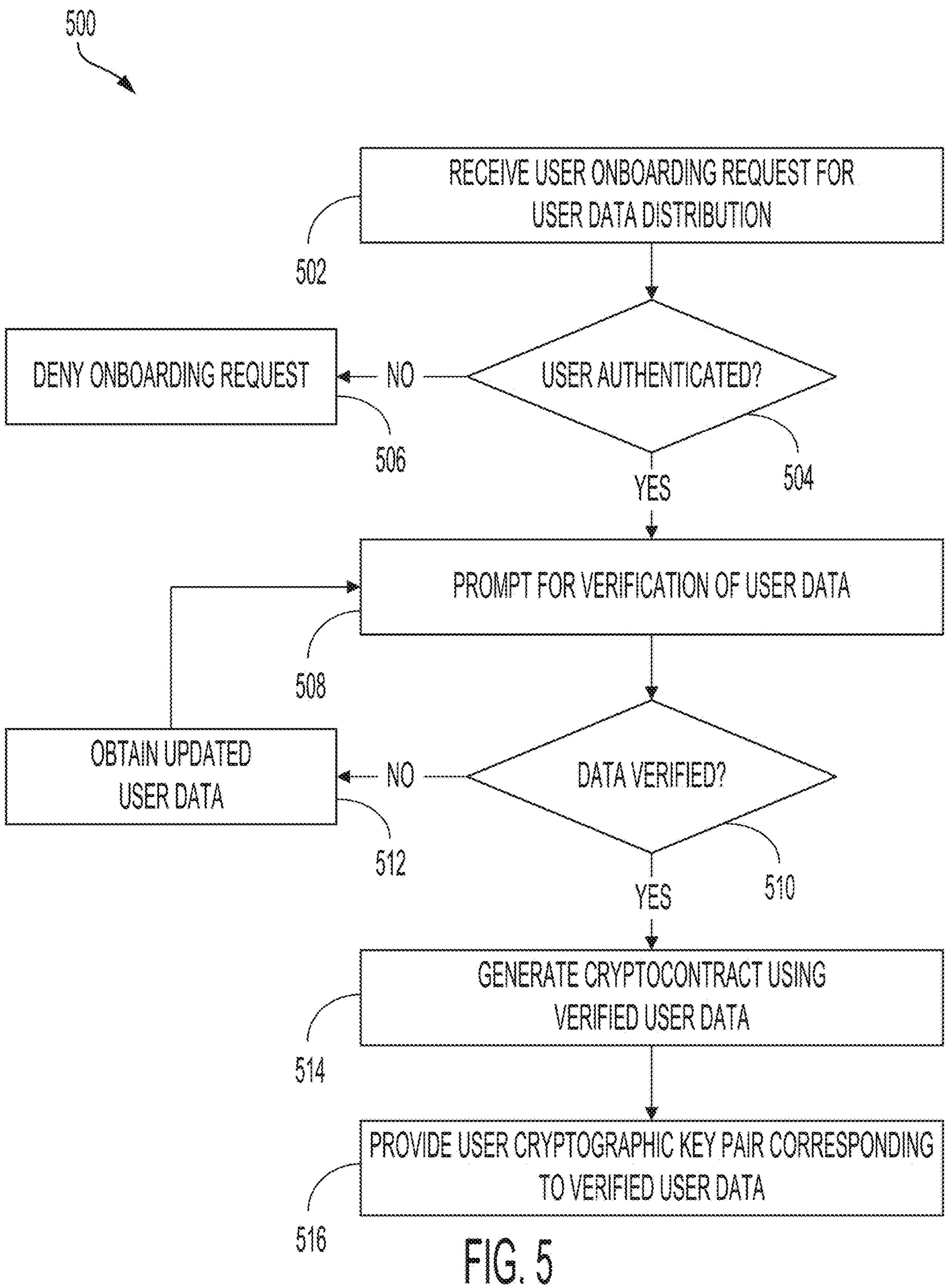
FIG. 5 shows an illustrative example of a process for generating a cryptocontract and a corresponding cryptographic key pair in response to a user onboarding request for the distribution of user data to other authorized nodes within a decentralized distributed ledger in accordance with at least one embodiment.

FIG. 5 shows an illustrative example of a process 500 for generating a cryptocontract and a corresponding cryptographic key pair in response to a user onboarding request for the distribution of user data to other authorized nodes within a decentralized distributed ledger in accordance with at least one embodiment. The process 500 may be performed by the user information processor in conjunction with the cryptocontract generator, both of which are described above in connection with FIGS. 2 and 3.

At step 502, the user information processor may receive a user onboarding request for automated distribution of user data to different service provider systems associated with the identity management system. The user onboarding request may include user data that the corresponding user would like distributed to designated service provider systems to allow these designated service provider systems to obtain the user data and perform one or more actions according to the user data (e.g., update user accounts associated with the user to incorporate the user data, perform automated payments using the user data, etc.). The user, in their user onboarding request, may provide a distribution list that includes unique identifiers corresponding to these designated service provider systems. As noted above, the user information processor may provide a GUI through which the user information process may provide unique identifiers corresponding to different service provider systems that are associated with the identity management system. These different service provider systems may be associated with the identity management system through an onboarding process for these different service provider systems whereby nodes corresponding to these different service provider systems are implemented in the decentralized network. Accordingly, from this GUI, the user may select one or more service provider systems for their initial distribution list.

At step 504, the user information processor may determine whether the user can be successfully authenticated. For instance, the user information processor may prompt the user to provide a set of credentials or other information that may be used to authenticate the user (e.g., username and password, one-time password, cryptographic token, etc.). As an illustrative example, if the identity management system is associated with a payment instrument service through which the user maintains one or more accounts associated with different payment instruments, the user may provide a set of credentials or other information that is associated with these one or more accounts for authentication of the user. In some instances, the user information processor may allow the user to provide a set of credentials or other information that may be associated with an account maintained by a service provider system affiliated with the identity management system. Accordingly, the user information processor may transmit a request to the corresponding service provider system for authentication of the user using this provided set of credentials or other information.

If the user information processor is unable to authenticate the user (e.g., the user has provided invalid credentials, the user has failed to respond to the prompt within a threshold period of time, etc.), the user information processor, at step 506, may deny the onboarding request. The user information processor, for example, may transmit a notification to the user to indicate that their onboarding request could not be processed. Further, the user information processor may prompt the user to provide a different set of credentials or other information that may be used to authenticate the user. In some instances, if the user cannot be authenticated, the user information processor may automatically terminate the GUI provided to the user for performance of the onboarding process.

If the user is successfully authenticated, the user information processor, at step 508, may prompt the user for verification of the user data that is to be distributed to the designated service provider systems through the decentralized distributed ledger. As noted above, the user information processor may query a user accounts datastore associated with the identity management system to retrieve user data associated with the user and maintained by the identity management system. The user data may include, for example, the name of the user, the geographic address of the user, an electronic mail address of the user, PANs or other account numbers associated with different accounts associated with the user, user PII, and the like. In an embodiment, the user information processor, through the aforementioned GUI, may present this user data from the user accounts datastore to the user for verification.

At step 510, the user information processor may determine whether the user has verified the user data that is to be distributed, through the decentralized distributed ledger, to the service provider systems included in the distribution list. If a user opts to provide different user data than that obtained from the user accounts datastore, the user information processor, at step 512, may obtain this different or updated user data from the user. For instance, through the aforementioned GUI provided by the user information processor, the user may define updated and or different user data that the user would like to distribute to the service provider systems indicated in the provided distribution list. As an illustrative example, if the user is moving to a new address, the user may provide this new address to the user information processor through the provided GUI. Once the user information processor has obtained the updated user data, the user information processor, at step 508, may again prompt the user to verify that the indicated user data is to be distributed to the service provider systems indicated in the distribution list.

If the user has verified the user data that is to be distributed to the selected service provider systems, the user information processor may provide the verified user data and the distribution list to a cryptocontract generator associated with the identity management system. Accordingly, at step 514, the cryptocontract generator may generate a new cryptocontract according to the verified user data. The cryptocontract may include a collection of programmatic code that, when executed, causes the cryptocontract to automatically generate a user-specific cryptographic key pair associated with the user and the verified user data that is to be encrypted using the user-specific cryptographic key pair and recorded in the decentralized distributed ledger. The user-specific cryptographic key pair may be unique to the verified user data being recorded in the decentralized distributed ledger and to the provided distribution list. The cryptocontract generator may deploy the newly generated cryptocontract to the decentralized distributed ledger through a node implemented within the decentralized network and associated with the identity management system.

The node associated with the identity management system, in response to receiving the cryptocontract, may execute the cryptocontract associated with the user and their verified user data to automatically generate the cryptographic key pair. Further, the cryptocontract may automatically use the private cryptographic key from this cryptographic key pair to encrypt the verified user data. The cryptocontract may additionally record the encrypted user data in the decentralized distributed ledger for distribution to different service provider systems and other entities according to user-provided distribution lists.

At step 516, the user information processor may provide the user-specific cryptographic key pair generated by the cryptocontract to the user. As noted above, if the user maintains a digital wallet for the storage of different cryptographic keys associated with different decentralized distributed ledgers, the user information processor may automatically add the cryptographic key pair to this digital wallet via the decentralized distributed ledger. In some instances, the user information processor may dynamically provision a new digital wallet for the user and, accordingly, provide a record corresponding to the generation of this digital wallet in the decentralized distributed ledger. The user information processor may, subsequently, add the cryptographic key pair to this newly generated digital wallet. If the user has designated a particular digital wallet for use in storing cryptographic keys, the user information processor may add the cryptographic key pair to this particular digital wallet. In some examples, the cryptocontract can be programmed to automatically add the cryptographic key pair to a designated digital wallet without further intervention from the cryptocontract generator or the user information processor.

Figure 6:
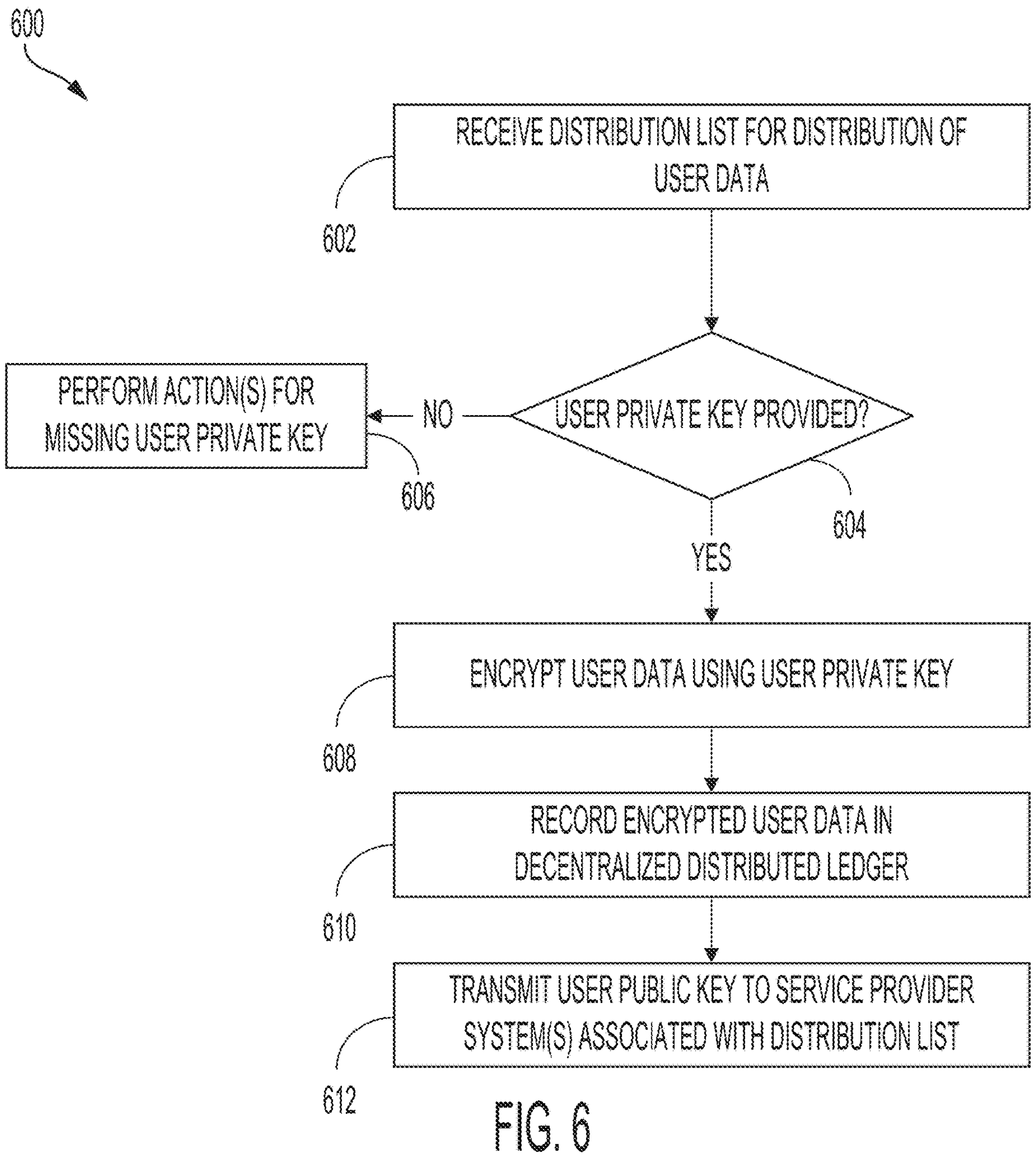
FIG. 6 shows an illustrative example of a process for distribution of public cryptographic keys corresponding to provided user data according to an indication of service provider systems authorized to access the provided user data in accordance with at least one embodiment.

FIG. 6 shows an illustrative example of a process 600 for distribution of public cryptographic keys corresponding to provided user data according to an indication of service provider systems authorized to access the provided user data in accordance with at least one embodiment. The process 600 may be performed by the user information processor in conjunction with the key distribution sub-system of the identity management system, both of which are described above in connection with FIGS. 2-4.

At step 602, the user information processor may receive a distribution list corresponding to different service provider systems that are authorized to obtain user data associated with a particular user from the decentralized distributed ledger. As noted above, a user, through a GUI implemented by the user information processor, may submit a distribution request for the distribution of their user data to a set of service provider systems. This set of service provider systems may be selected through the GUI and, upon selection, may be added to a distribution list for the user data selected by the user for distribution.

At step 604, the user information processor may determine whether a user-specific private cryptographic key has been provided or is otherwise available for encryption of the user data that is to be provided to the selected set of service provider systems. The identity management system, as noted above, may deploy a cryptocontract corresponding to the user data that may be made available to different service provider systems according to a defined distribution list for the user data. When the cryptocontract is executed from the decentralized distributed ledger, the cryptocontract may automatically generate a user-specific cryptographic key pair that is unique to the particular user data being recorded in the decentralized distributed ledger. The user-specific cryptographic key pair may be provided to the user (such as through a digital wallet associated with the user). In their request to the user information processor to distribute the user data to the selected set of service provider systems (as indicated through the distribution list), the user may provide their user-specific private cryptographic key for the encryption of their user data. In some instances, the user information processor may automatically access the digital wallet associated with the user to determine whether the user-specific private cryptographic key is available for encryption of the user data.

If the user information processor determines that the user-specific private cryptographic key is unavailable for the user data being distributed to the set of service provider systems, the user information processor, at step 606, may perform a set of actions corresponding to a missing user-specific private cryptographic key. For instance, the absence of a user-specific private cryptographic key may indicate that the request to distribute the selected user data to the set of service provider systems indicated in the distribution list is the first such request corresponding to the selected user data. Accordingly, the user information processor, through the cryptocontract generator described above, may generates a new cryptocontract corresponding to the user data that is to be distributed to the set of service provider systems indicated in the provided distribution list. The new cryptocontract may automatically generate a new user-specific cryptographic key pair that is unique to the user data being recorded in the decentralized distributed ledger. The cryptocontract may provide the newly generated cryptographic key pair to the user through the cryptocontract generator and the user information processor.

If the user-specific private cryptographic key corresponding to the user data is available, the user information processor, at step 608, may transmit a request to the identity management system node deployed in the decentralized network to encrypt the user data using the user-specific private cryptographic key. This node may execute the cryptocontract associated with the user data and deployed in the decentralized distributed ledger. The cryptocontract may use the provided user-specific private cryptographic key to dynamically encrypt the user data for recordation into the decentralized distributed ledger. Accordingly, once the user data has been encrypted, the cryptocontract, at step 610, may automatically record the encrypted user data in the decentralized distributed ledger.

At step 612, once the encrypted user data has been recorded in the decentralized distributed ledger, the key distribution sub-system of the identity management system may transmit the user-specific public cryptographic key associated with the user data to each of the service provider systems indicated in the distribution list. The key distribution sub-system, for instance, may generate new messages that include the user-specific public cryptographic key corresponding to the cryptographic key pair associated with the recorded user data and usable to decrypt the user data encrypted using the user-specific private cryptographic key and recorded in the decentralized distributed ledger. As noted above, for a given service provider system authorized to receive the user data from the decentralized distributed ledger, the key distribution sub-system may generate a message that includes a unique identifier corresponding to the service provider system and the user-specific public cryptographic key. Further, the key distribution sub-system may encrypt the new message using the system-specific private cryptographic key associated with the given service provider system such that only the given service provider system, using its system-specific public cryptographic key, may decrypt the message and obtain the user-specific public cryptographic key. Using the user-specific public cryptographic key, the service provider system may decrypt the user data from the decentralized distributed ledger.

Figure 7:
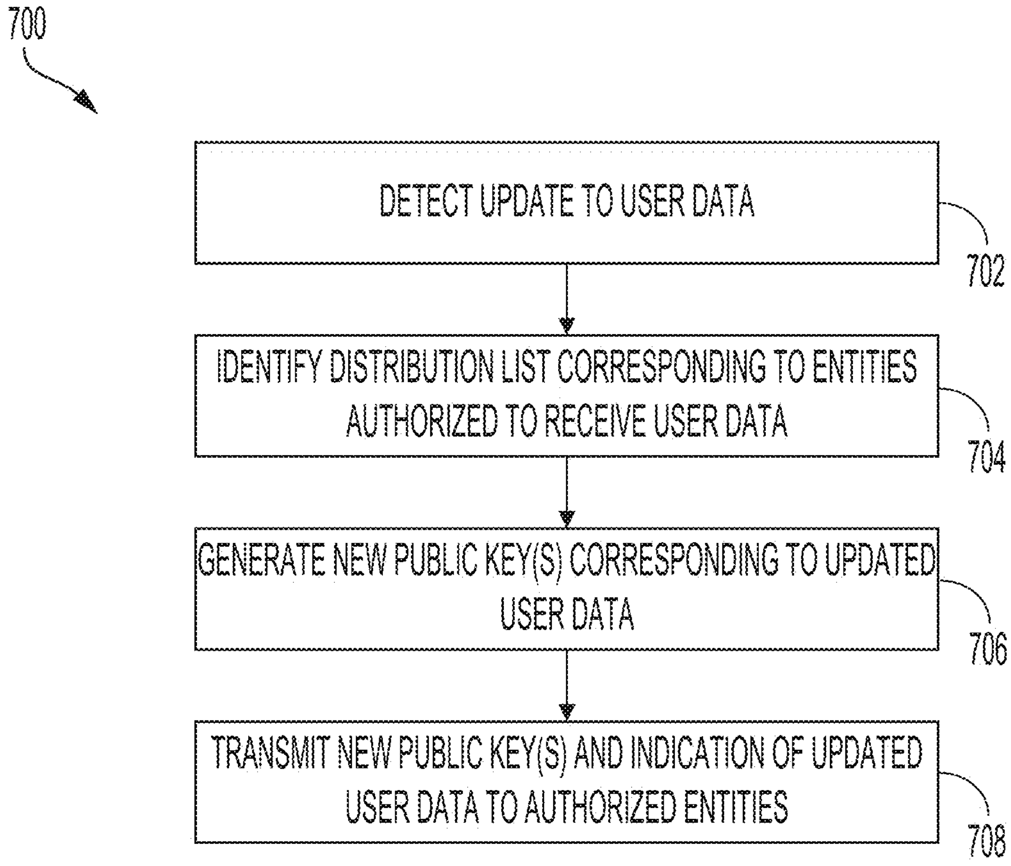
FIG. 7 shows an illustrative example of a process for generating and distributing new public cryptographic keys corresponding to updated user data to allow for access to the updated user data through a decentralized distributed ledger in accordance with at least one embodiment.

FIG. 7 shows an illustrative example of a process 700 for generating and distributing new public cryptographic keys corresponding to updated user data to allow for access to the updated user data through a decentralized distributed ledger in accordance with at least one embodiment. The process 700 may be performed by the aforementioned user information processor in conjunction with the cryptocontract generator implemented by the identity management system, both of which are described above in connection with FIGS. 2 and 3. Further, certain steps corresponding to the process 700 may be performed by the aforementioned key distribution sub-system of the identity management system.

At step 702, the user information processor may detect an update to user data that was previously distributed to a set of service provider systems (as indicated through an existing distribution list for the user data). Returning to an earlier illustrative example, if a user is moving to a new location, this user, through the GUI implemented by the user information processor, may update their user data to indicate the new address corresponding to this new location. As another illustrative example, if the user has received a new payment instrument that they would like to use this new payment instrument for automated payments associated with the service provider systems indicated in the existing distribution list, the user, through the GUI, may update their user data to include the PAN or other account number associated with this new payment instrument.

At step 704, the user information processor may identify the distribution list corresponding to the service provider systems and other entities that are authorized to receive the user data. As noted above, the user information processor, through the GUI, may allow the user to define one or more distribution lists for distribution of their updated user data. For instance, the user information processor may provide the user with a listing or other ordering of different service provider systems and other entities that are associated with the identity management system (such as through an onboarding process described herein in connection with FIG. 10). In an embodiment, if the user maintains an existing distribution list for the user data, the user information processor may retrieve this existing distribution list from a user accounts datastore maintained by the identity management system. The user information processor may present this existing distribution list to the user through the GUI and prompt the user to verify that the updated user data is to be distributed to the service provider systems indicated in the distribution list.

At step 706, the user information processor, through the cryptocontract generator, may generate a new user-specific public cryptographic key that may be used to decrypt the updated user data from the decentralized distributed ledger. For instance, the user information processor may provide the updated user data to the cryptocontract generator for encryption and recording in the decentralized distributed ledger. The cryptocontract generator, in response to receiving the updated user data and the corresponding distribution list, may obtain the user-specific cryptographic key from the node associated with the identity management system in the decentralized network and encrypts the updated user data. Upon encrypting the updated user data using the user-specific private cryptographic key, the cryptocontract generator may execute the cryptocontract associated with the user and their corresponding user data to record the encrypted user data in the decentralized distributed ledger. The cryptocontract may further generate a new user-specific public cryptographic key corresponding to the encrypted user data.

It should be noted that, in some instances, a new cryptocontract corresponding to the updated user data may be generated to generate a new user-specific cryptographic key pair (including a new user-specific public cryptographic key) that is uniquely associated with the updated user data. This new cryptocontract, when executed by the node associated with the identity management system in the decentralized network, may automatically encrypt the updated user data using the new private cryptographic key from the new user-specific cryptographic key pair and may record the updated user data in encrypted form within the decentralized distributed ledger. The cryptocontract, through the node implemented by the identity management system in the decentralized network, may return the new user-specific cryptographic key pair to the user information processor for distribution to the user.

At step 708, regardless of whether a new public cryptographic key is generated through an existing cryptocontract associated with the user data or a new cryptocontract deployed for the updated user data, the key distribution sub-system may distribute the new public cryptographic key corresponding to the updated user data to the service provider systems indicated in the distribution list associated with the updated user data. The key distribution sub-system may obtain, from the user information processor, the distribution list corresponding to the updated user data. Using this distribution list, key distribution sub-system, through the node implemented by the identity management system in the decentralized network, may transmit a message to each service provider system specified in the distribution list to provide the user-specific public cryptographic key corresponding to the updated user data. For instance, the key distribution sub-system, for each service provider system indicated in the distribution list, may use the system-specific private cryptographic key corresponding to the service provider system to encrypt the new message containing the unique identifier of the service provider system and the new user-specific public cryptographic key. The key distribution sub-system, through the node associated with the identity management system implemented in the decentralized network, may transmit the encrypted message to the service provider system.

Figure 8:
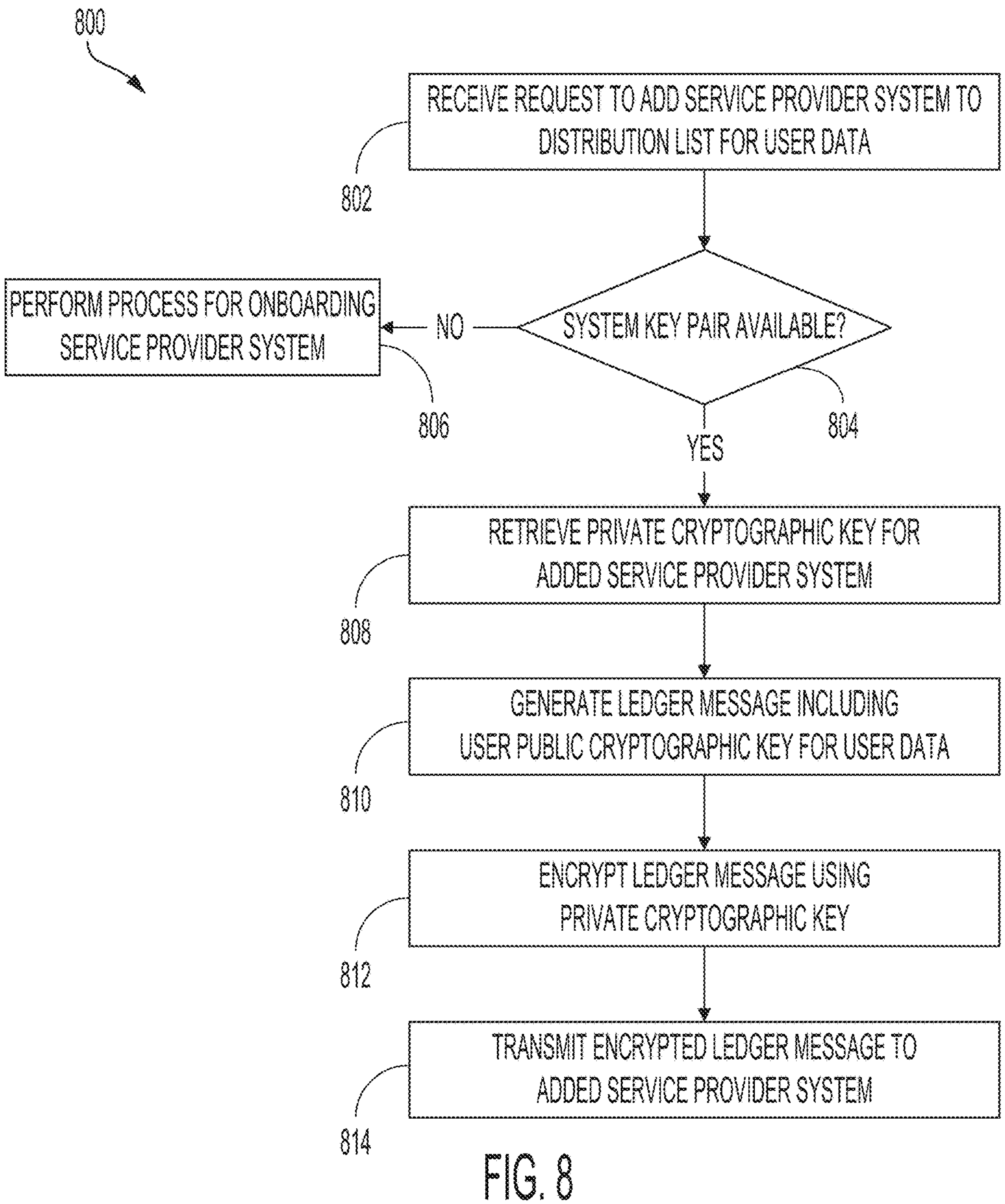
FIG. 8 shows an illustrative example of a process for automatically distributing a public cryptographic key for accessing user data to a service provider system in response to a request to add the service provider system to a distribution list for the user data in accordance with at least one embodiment.

FIG. 8 shows an illustrative example of a process 800 for automatically distributing a user-specific public cryptographic key for accessing user data to a service provider system in response to a request to add the service provider system to a distribution list for the user data in accordance with at least one embodiment. The process 800 may be performed by the user information processor in conjunction with a key distribution sub-system of the identity management system, as described above in connection with FIGS. 2-4.

At step 802, the user information processor may receive a request to add one or more service provider systems to an existing distribution list associated with particular user data. As noted above, the user information processor may provide, to users associated with the identity management system, a GUI through which the user may submit distribution requests corresponding to different user data that the user would like to automatically distribute to a selected set of service provider systems and/or other entities. Through these distribution requests, a user may define different distribution lists that indicate which service provider systems and/or other entities are authorized to access selected user data associated with the user from the decentralized distributed ledger. In an embodiment, the user information processor presents the user with their distribution lists corresponding to different user data that may be distributed to the service provider systems and/or other entities included in the distribution lists. Further, through the GUI, the user information processor may allow the user to modify any of these distributions. For instance, if a user wishes to add a service provider system to an existing distribution list, the user may select, through the GUI, the unique identifier corresponding to this service provider system for inclusion in the existing distribution list.

At step 804, for the added service provider system, the user information processor may determine whether a system-specific cryptographic key pair is available. As noted above, in response to an onboarding request from a service provider system, the user information processor may vet the service provider system and, through a cryptocontract generator associated with the identity management system, provision a unique system-specific cryptographic key pair associated with the service provider system. This system-specific cryptographic key pair may be required to encrypt messages including user-specific public cryptographic keys associated with the user for delivery to the service provider system. The key distribution sub-system of the identity management system may provide the system-specific public cryptographic key corresponding to the system-specific cryptographic key pair to the service provider system. For instance, the key distribution sub-system may transmit a message directly to the service provider system that encodes the system-specific public cryptographic key from the system-specific cryptographic key pair. Alternatively, the key distribution sub-system, through the node associated with the identity management system in the decentralized network, may transmit the system-specific public cryptographic key to the node associated with the service provider system in the decentralized network. In some instances, the key distribution sub-system may automatically add the system-specific cryptographic key to a digital wallet associated with the service provider system.

If the user information processor determines that the system-specific cryptographic key pair associated with a service provider system added to the distribution list is not available (e.g., the service provider system has not completed an onboarding process, the system-specific cryptographic key pair is expired, etc.), the user information processor, at step 806, may perform a process for onboarding the service provider system. Through this onboarding process, the user information processor may vet the service provider system and, using the cryptographic generator, generate a new system-specific cryptographic key pair for the service provider system. This onboarding process is described in greater detail herein in connection with FIG. 10.

If the user information processor determines that the system-specific cryptographic key pair corresponding to the added service provider system is available, the user information processor, at step 808, may retrieve the system-specific private cryptographic key for this added service provider system. For instance, if the system-specific cryptographic key pair is stored within a digital wallet associated with the service provider system, the user information processor may automatically access the digital wallet to retrieve the private cryptographic key associated with this key pair. Alternatively, if the identity management system maintain the system-specific cryptographic key pairs associated with the different service provider systems affiliated with the identity management system, the user information processor may automatically retrieve the system-specific private cryptographic key from a keystore maintained by the identity management system on behalf of onboarded service provider systems.

The user information processor may pass the updated distribution list, the system-specific private cryptographic key, and the user data associated with this updated distribution list to the key distribution sub-system. At step 810, the key distribution sub-system may generate a ledger message that includes the user-specific public cryptographic key usable to decrypt the user data from the decentralized distributed ledger. The ledger message may include a field corresponding to the unique identifier associated with the service provider system added to the distribution list and that is to receive the ledger message. This unique identifier, in some instances, may correspond to the foreign identifier or other identifier associated with the service provider system and provided during the onboarding process for the service provider system. The ledger message may further include a field through which the key distribution sub-system may encode the user-specific public cryptographic key corresponding to the encrypted user data in the decentralized distributed ledger.

At step 812, the key distribution sub-system may encrypt the ledger message using the system-specific private cryptographic key corresponding to the service provider system that is to receive this ledger message. Encryption of the ledger message that is to be transmitted to the service provider system may prevent inadvertent exposure of the user-specific public cryptographic key and the unique identifier corresponding to the service provider system to any unauthorized entities, including other service provider systems that may have been included in the distribution list for the user data.

At step 814, the key distribution sub-system may transmit the encrypted ledger message to the service provider system added to the distribution list. For instance, the key distribution sub-system, through the node associated with the identity management system in the decentralized network, may transmit this encrypted ledger message to the node associated with the service provider system in the decentralized network. The service provider system may use its system-specific public cryptographic key to decrypt the received ledger message and to obtain the user-specific public cryptographic key. Using the user-specific public cryptographic key, the service provider system may decrypt the user data from the decentralized distributed ledger and perform any corresponding actions using this user data (e.g., updating a user account to incorporate the user data, etc.).

Figure 9:
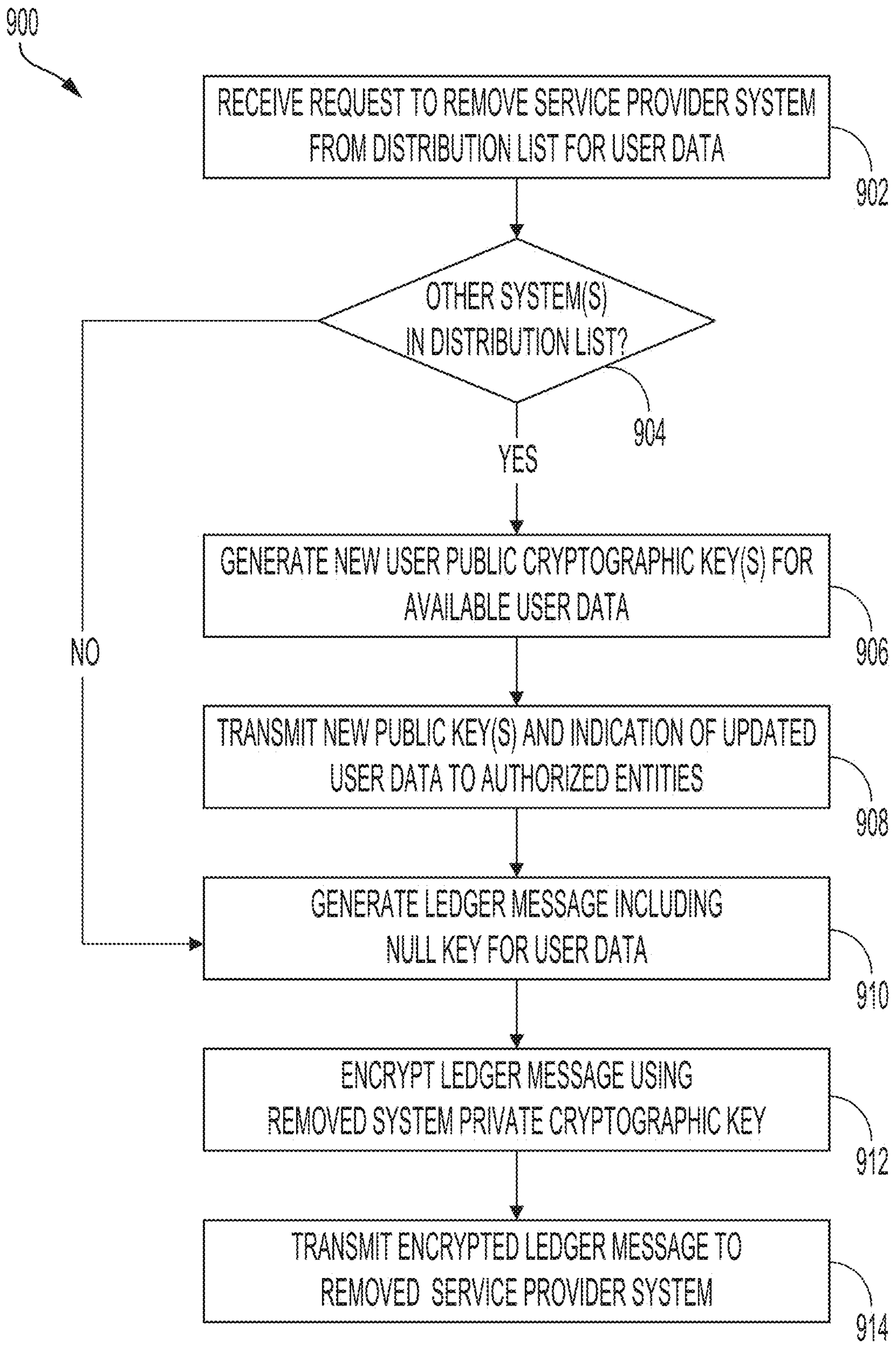
FIG. 9 shows an illustrative example of a process for automatically deauthorizing a service provider system from retrieving user data from a decentralized distributed ledger in accordance with at least one embodiment.

FIG. 9 shows an illustrative example of a process 900 for automatically deauthorizing a service provider system from retrieving user data from a decentralized distributed ledger in accordance with at least one embodiment. The process 900 may be performed by the user information processor in conjunction with a cryptocontract generator and a key distribution sub-system of the identity management system, as described above in connection with FIGS. 2-4.

At step 902, the user information processor may receive a request from a user to remove one or more service provider systems from a distribution list associated with particular user data that is made available to service provider systems indicated in the distribution list through the decentralized distributed ledger. Similar to the process 800 described above in connection with FIG. 8, the user information processor may provide, to users associated with the identity management system, a GUI through which the user may submit distribution requests corresponding to different user data that the user would like to automatically distribute to a selected set of service provider systems and/or other entities. Through this GUI, the user information processor may further present the user with their distribution lists corresponding to different user data that may be distributed to the service provider systems and/or other entities included in the distribution lists. The user, through the GUI, may review the distribution list corresponding to particular user data and remove one or more service provider systems from the distribution list. By removing a service provider system from a distribution list, the user is deauthorizing that service provider system from accessing the user data associated with this distribution list.

At step 904, the user information processor may determine whether there are any remaining service provider systems indicated in the distribution list. If the user information processor determines that there are other service provider systems remaining in the distribution list selected by the user, the user information processor, at step 906, may generate a new user-specific public cryptographic key for the user data associated with the updated distribution list. For instance, the user information processor, through the cryptocontract generator implemented by the identity management system, may execute a cryptocontract associated with the user data and deployed in the decentralized distributed ledger to dynamically generate a new user-specific public cryptographic key that may be used to decrypt the latest version of the user data from the decentralized distributed ledger.

In an embodiment, the user information processor, through the cryptocontract generation, can generate and deploy a new cryptocontract corresponding to the user data. This new cryptocontract, when executed by a node associated with the identity management system in the decentralized network, may automatically generate a new user-specific cryptographic key pair corresponding to the user data and the modified distribution list. The new user-specific private cryptographic key from this key pair may be used by the cryptocontract to dynamically encrypt the user data. The cryptocontract may subsequently record the encrypted user data in the decentralized distributed ledger. Further, the cryptocontract, through the user information processor, may provide this new user-specific cryptographic key pair to the user, such as through the user's digital wallet. Through the generation of this new user-specific cryptographic key pair, the cryptocontract may obtain the new user-specific public cryptographic key usable to decrypt the user data from the decentralized distributed ledger.

At step 908, the key distribution sub-system associated with the identity management system may transmit the newly generated user-specific public cryptographic key and an indication of the update to the user data (if any) to the service provider systems still referenced in the modified distribution list. For instance, for each service provider system indicated in the modified distribution list, the key distribution sub-system may generate a new ledger message that encodes the unique identifier of the service provider system and the newly generated user-specific public cryptographic key associated with the user data. The ledger message for a particular service provider system may include a field corresponding to the unique identifier associated with the service provider system. Further, the ledger message may include a field through which the key distribution sub-system may encode the newly generated user-specific public cryptographic key corresponding to the encrypted user data in the decentralized distributed ledger.

At step 910, the key distribution sub-system may generate, for the service provider system removed from the distribution list, a new ledger message that does not include the newly generated user-specific public cryptographic key. For instance, the key distribution sub-system, through the cryptocontract associated with the user data and the distribution list submitted by the user, may generate a ledger message that, for a field corresponding to the user-specific public cryptographic field, includes a null value (e.g., "public_key_for_user"="NULL"). This null value may serve as an indication that the new ledger message does not include a public cryptographic key usable to retrieve and decrypt the most recent version of the user data from the decentralized distributed ledger.

At step 912, the key distribution sub-system may encrypt the ledger message including a null value for the field corresponding to the user-specific public cryptographic key. For instance, the key distribution sub-system may retrieve a system-specific private cryptographic key associated with the removed service provider system and, accordingly, use this system-specific private cryptographic key to encrypt the new ledger message. As noted above, during an onboarding process for the service provider system, the identity management system may automatically generate and add the system-specific cryptographic key pair to a digital wallet associated with the service provider system. The key distribution sub-system may access this digital wallet to access the system-specific private cryptographic key for encryption of the ledger message that is to be transmitted to the removed service provider system.

At step 914, the key distribution sub-system may transmit the encrypted ledger message containing the null value for the user-specific public cryptographic key field to the removed service provider system. For instance, as noted above, the key distribution sub-system, through the node associated with the identity management system in the decentralized network, may transmit this encrypted ledger message to the node associated with the removed service provider system in the decentralized network. The removed service provider system may use its system-specific public cryptographic key to decrypt the received ledger message and receive the null value for the user-specific public cryptographic key. As a result, this service provider system may no longer be able to obtain and decrypt the user data in the future (such as when the user submits a new request to update and distribute their user data to the remaining service provider systems indicated in the distribution list).

It should be noted that a service provider system removed from the distribution list defined by the user may still have access to outdated user data through the decentralized distributed ledger. For instance, a removed service provider system may still be able to use a previously provided public cryptographic key corresponding to an older version of the user data to decrypt this older version of the user data from the decentralized distributed ledger. However, this older version of the user data may be outdated and, thus, may not represent the up-to-date user data that the user has opted to distribute to authorized service provider systems through the decentralized distributed ledger by virtue of their inclusion in the distribution list.

Figure 10:
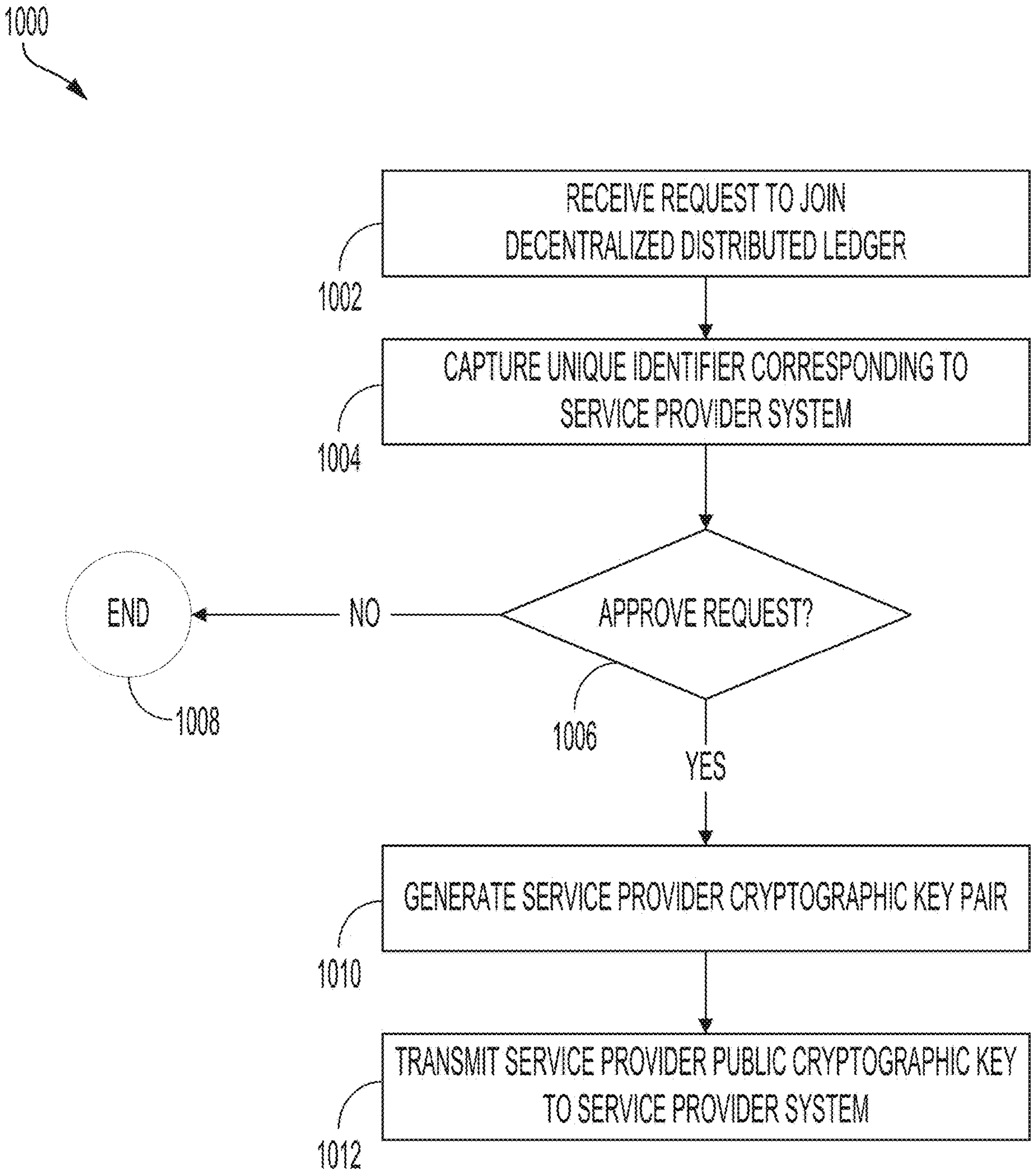
FIG. 10 shows an illustrative example of a process for onboarding a new node associated with a service provider system to a decentralized distributed ledger to allow for retrieval of user data from the decentralized distributed ledger in accordance with at least one embodiment.

FIG. 10 shows an illustrative example of a process 1000 for onboarding a new node associated with a service provider system to a decentralized distributed ledger to allow for retrieval of user data from the decentralized distributed ledger in accordance with at least one embodiment. The process 1000 may be performed by the key distribution sub-system of the identity management system. In some instances, certain operations associated with the process 1000 (as described in greater detail herein) may be performed in conjunction with a cryptocontract deployed to the decentralized distributed ledger and executed through a node associated with the identity management system in the decentralized network.

At step 1002, the key distribution sub-system may receive a request from a service provider system or other entity to join the decentralized network and, accordingly, the decentralized distributed ledger. This request, in some instances, may include a unique identifier corresponding to the service provider system or other entity. This unique identifier may be a foreign identifier used by the service provider system to identify their users within the service provider system ecosystem. For example, the foreign identifier may include a unique telephone number associated with the service provider system or other entity. As another illustrative example, the foreign identifier may include an identifier used by the service provider system or other entity to identify their users, such as through account statements and other notifications to these users. The key distribution sub-system, at step 1004, may capture this unique identifier corresponding to the service provider system or other entity from the request.

At step 1006, the key distribution sub-system may determine whether to approve the request from the service provider system or other entity to join the decentralized network and the decentralized distributed ledger. As noted above, in response to such a request, the key distribution sub-system may automatically perform a vetting process to ensure that the service provider system or other entity is not a malicious entity and that the service provider system or other entity provides legitimate services to users. As part of this vetting process, the key distribution sub-system may request, from the service provider system or other entity, a set of credentials or other information that may be authenticated by the identity management system or an authorized third-party entity. If the service provider authenticator is unable to authenticate the service provider system or other entity (e.g., the set of credentials or other information provided is invalid, the service provider system or other entity has failed to provide sufficient information needed for authentication, etc.), the key distribution sub-system may reject the onboarding request from the service provider system or other entity. Accordingly, the process 1000 may terminate at step 1008 if the request is rejected.

If the key distribution sub-system determines that the service provider system or other entity may be added to the decentralized network and the decentralized distributed ledger, the key distribution sub-system, at step 1010, may generate a new system-specific cryptographic key pair for the service provider entity or other entity. For instance, if the request from the service provider system or other entity is approved by the key distribution sub-system, the key distribution sub-system may transmit a response to the service provider system or other entity to indicate that the service provider system or other entity is authorized to provision and deploy a new node within the decentralized network. This new node may be used by the service provider system or other entity to access the decentralized distributed ledger to retrieve user data. Further, this new node may be used by the service provider system or other entity to receive encrypted messages from the node associated with the identity management system (e.g., messages encoding user-specific public cryptographic keys, etc.).

The key distribution sub-system, in some instances, may receive a notification from this newly provisioned node (such as through the node associated with the identity management system) indicating that the newly provisioned node is available to receive messages within the decentralized network and to access the decentralized distributed ledger. Accordingly, the key distribution sub-system, through the node associated with the identity management system, may generate and deploy a new cryptocontract corresponding to the service provider system or other entity. This newly generated cryptocontract may be executed by the node associated with the identity management system to automatically generate a new system-specific cryptographic key pair that is uniquely associated with the service provider system or other entity. As noted above, the system-specific cryptographic key pair may be used to encrypt messages transmitted by the identity management system to the node associated with the service provider system or other entity through the decentralized network.

At step 1012, the key distribution sub-system may transmit the system-specific public cryptographic key from the system-specific cryptographic key pair to the service provider system or other entity. For instance, the key distribution sub-system may transmit a message directly to the service provider system or other entity that encodes the system-specific public cryptographic key from the newly generated cryptographic key pair. Alternatively, the key distribution sub-system, through the node associated with the identity management system in the decentralized network, may transmit the system-specific public cryptographic key to the node associated with the service provider system or other entity in the decentralized network. In some instances, the key distribution sub-system may automatically add the system-specific public cryptographic key to a digital wallet associated with the service provider system or other entity. For example, the key distribution sub-system may transmit the system-specific public cryptographic key to a unique address associated with this digital wallet. This unique address may be provided by the service provider system or other entity in the request received at step 1002 or in response to a request from the key distribution sub-system. In some instances, the key distribution sub-system may dynamically provision a new digital wallet for the service provider system or other system in response to the request to join the decentralized network and the decentralized distributed ledger. Once provisioned, the key distribution sub-system may store the system-specific public cryptographic key in this new digital wallet.

In some instances, in addition to providing the system-specific public cryptographic key to the service provider system or other entity, the key distribution sub-system may store the system-specific cryptographic key pair in a service provider keystore. Alternatively, as noted above, the identity management system does not store system-specific cryptographic key pairs associated with the different service provider systems or other entities in a keystore or other database. In these instances, the key distribution sub-system may provide the system-specific cryptographic key pair to the corresponding service provider system or other entity (such as through a message or digital wallet associated with the service provider system or other entity). Alternatively, the key distribution sub-system may add the system-specific cryptographic key pair to a digital wallet associated with the identity management system and maintained by the node associated with the identity management system in the decentralized network.

FIG. 11 illustrates a computing system architecture 1100, including various components in electrical communication with each other, in accordance with some embodiments. The example computing system architecture 1100 illustrated in FIG. 11 includes a computing device 1102, which has various components in electrical communication with each other using a connection 1106, such as a bus, in accordance with some implementations. The example computing system architecture 1100 includes a processing unit 1104 that is in electrical communication with various system components, using the connection 1106, and including the system memory 1114. In some embodiments, the system memory 1114 includes read-only memory (ROM), random-access memory (RAM), and other such memory technologies including, but not limited to, those described herein. In some embodiments, the example computing system architecture 1100 includes a cache 1108 of high-speed memory connected directly with, in close proximity to, or integrated as part of the processor 1104. The system architecture 1100 can copy data from the memory 1114 and/or the storage device 1110 to the cache 1108 for quick access by the processor 1104. In this way, the cache 1108 can provide a performance boost that decreases or eliminates processor delays in the processor 1104 due to waiting for data. Using modules, methods and services such as those described herein, the processor 1104 can be configured to perform various actions. In some embodiments, the cache 1108 may include multiple types of cache including, for example, level one (L1) and level two (L2) cache. The memory 1114 may be referred to herein as system memory or computer system memory. The memory 1114 may include, at various times, elements of an operating system, one or more applications, data associated with the operating system or the one or more applications, or other such data associated with the computing device 1102.

Other system memory 1114 can be available for use as well. The memory 1114 can include multiple different types of memory with different performance characteristics. The processor 1104 can include any general purpose processor and one or more hardware or software services, such as service 1112 stored in storage device 1110, configured to control the processor 1104 as well as a special-purpose processor where software instructions are incorporated into the actual processor design. The processor 1104 can be a completely self-contained computing system, containing multiple cores or processors, connectors (e.g., buses), memory, memory controllers, caches, etc. In some embodiments, such a self-contained computing system with multiple cores is symmetric. In some embodiments, such a self-contained computing system with multiple cores is asymmetric. In some embodiments, the processor 1104 can be a microprocessor, a microcontroller, a digital signal processor ("DSP"), or a combination of these and/or other types of processors. In some embodiments, the processor 1104 can include multiple elements such as a core, one or more registers, and one or more processing units such as an arithmetic logic unit (ALU), a floating point unit (FPU), a graphics processing unit (GPU), a physics processing unit (PPU), a digital system processing (DSP) unit, or combinations of these and/or other such processing units.

To enable user interaction with the computing system architecture 1100, an input device 1116 can represent any number of input mechanisms, such as a microphone for speech, a touch-sensitive screen for gesture or graphical input, keyboard, mouse, motion input, pen, and other such input devices. An output device 1118 can also be one or more of a number of output mechanisms known to those of skill in the art including, but not limited to, monitors, speakers, printers, haptic devices, and other such output devices. In some instances, multimodal systems can enable a user to provide multiple types of input to communicate with the computing system architecture 1100. In some embodiments, the input device 1116 and/or the output device 1118 can be coupled to the computing device 1102 using a remote connection device such as, for example, a communication interface such as the network interface 1120 described herein. In such embodiments, the communication interface can govern and manage the input and output received from the attached input device 1116 and/or output device 1118. As may be contemplated, there is no restriction on operating on any particular hardware arrangement and accordingly the basic features here may easily be substituted for other hardware, software, or firmware arrangements as they are developed.

In some embodiments, the storage device 1110 can be described as non-volatile storage or non-volatile memory. Such non-volatile memory or non-volatile storage can be a hard disk or other types of computer readable media which can store data that are accessible by a computer, such as magnetic cassettes, flash memory cards, solid state memory devices, digital versatile disks, cartridges, RAM, ROM, and hybrids thereof.

As described herein, the storage device 1110 can include hardware and/or software services such as service 1112 that can control or configure the processor 1104 to perform one or more functions including, but not limited to, the methods, processes, functions, systems, and services described herein in various embodiments. In some embodiments, the hardware or software services can be implemented as modules. As illustrated in example computing system architecture 1100, the storage device 1110 can be connected to other parts of the computing device 1102 using the system connection 1106. In an embodiment, a hardware service or hardware module such as service 1112, that performs a function can include a software component stored in a non-transitory computer-readable medium that, in connection with the necessary hardware components, such as the processor 1104, connection 1106, cache 1108, storage device 1110, memory 1114, input device 1116, output device 1118, and so forth, can carry out the functions such as those described herein.

The disclosed identity management system, the subsystems and other processes of the identity management system, and the systems and methods for dynamically, and in real-time, distributing updated user data to authorized service provider systems through a decentralized distributed ledger can be performed using a computing system such as the example computing system illustrated in FIG. 11, using one or more components of the example computing system architecture 1100. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device.

In some embodiments, the processor can be configured to carry out some or all of methods and systems for dynamically, and in real-time, distributing updated user data to authorized service provider systems through a decentralized distributed ledger described herein by, for example, executing code using a processor such as processor 1104 wherein the code is stored in memory such as memory 1114 as described herein. One or more of a user device, a provider server or system, a database system, or other such devices, services, or systems may include some or all of the components of the computing system such as the example computing system illustrated in FIG. 11, using one or more components of the example computing system architecture 1100 illustrated herein. As may be contemplated, variations on such systems can be considered as within the scope of the present disclosure.

This disclosure contemplates the computer system taking any suitable physical form. As example and not by way of limitation, the computer system can be an embedded computer system, a system-on-chip (SOC), a single-board computer system (SBC) (such as, for example, a computer-on-module (COM) or system-on-module (SOM)), a desktop computer system, a laptop or notebook computer system, a tablet computer system, a wearable computer system or interface, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud computing system which may include one or more cloud components in one or more networks as described herein in association with the computing resources provider 1128. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor 1104 can be a conventional microprocessor such as an Intel® microprocessor, an AMD® microprocessor, a Motorola® microprocessor, or other such microprocessors. One of skill in the relevant art will recognize that the terms "machine-readable (storage) medium" or "computer-readable (storage) medium" include any type of device that is accessible by the processor.

The memory 1114 can be coupled to the processor 1104 by, for example, a connector such as connector 1106, or a bus. As used herein, a connector or bus such as connector 1106 is a communications system that transfers data between components within the computing device 1102 and may, in some embodiments, be used to transfer data between computing devices. The connector 1106 can be a data bus, a memory bus, a system bus, or other such data transfer mechanism. Examples of such connectors include, but are not limited to, an industry standard architecture (ISA" bus, an extended ISA (EISA) bus, a parallel AT attachment (PATA" bus (e.g., an integrated drive electronics (IDE) or an extended IDE (EIDE) bus), or the various types of parallel component interconnect (PCI) buses (e.g., PCI, PCIe, PCI-104, etc.).

The memory 1114 can include RAM including, but not limited to, dynamic RAM (DRAM), static RAM (SRAM), synchronous dynamic RAM (SDRAM), non-volatile random access memory (NVRAM), and other types of RAM. The DRAM may include error-correcting code (EEC). The memory can also include ROM including, but not limited to, programmable ROM (PROM), erasable and programmable ROM (EPROM), electronically erasable and programmable ROM (EEPROM), Flash Memory, masked ROM (MROM), and other types or ROM. The memory 1114 can also include magnetic or optical data storage media including read-only (e.g., CD ROM and DVD ROM) or otherwise (e.g., CD or DVD). The memory can be local, remote, or distributed.

As described herein, the connector 1106 (or bus) can also couple the processor 1104 to the storage device 1110, which may include non-volatile memory or storage and which may also include a drive unit. In some embodiments, the non-volatile memory or storage is a magnetic floppy or hard disk, a magnetic-optical disk, an optical disk, a ROM (e.g., a CD-ROM, DVD-ROM, EPROM, or EEPROM), a magnetic or optical card, or another form of storage for data. Some of this data may be written, by a direct memory access process, into memory during execution of software in a computer system. The non-volatile memory or storage can be local, remote, or distributed. In some embodiments, the non-volatile memory or storage is optional. As may be contemplated, a computing system can be created with all applicable data available in memory. A typical computer system will usually include at least one processor, memory, and a device (e.g., a bus) coupling the memory to the processor.

Software and/or data associated with software can be stored in the non-volatile memory and/or the drive unit. In some embodiments (e.g., for large programs) it may not be possible to store the entire program and/or data in the memory at any one time. In such embodiments, the program and/or data can be moved in and out of memory from, for example, an additional storage device such as storage device 1110. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The connection 1106 can also couple the processor 1104 to a network interface device such as the network interface 1120. The interface can include one or more of a modem or other such network interfaces including, but not limited to those described herein. It will be appreciated that the network interface 1120 may be considered to be part of the computing device 1102 or may be separate from the computing device 1102. The network interface 1120 can include one or more of an analog modem, Integrated Services Digital Network (ISDN) modem, cable modem, token ring interface, satellite transmission interface, or other interfaces for coupling a computer system to other computer systems. In some embodiments, the network interface 1120 can include one or more input and/or output (I/O) devices. The I/O devices can include, by way of example but not limitation, input devices such as input device 1116 and/or output devices such as output device 1118. For example, the network interface 1120 may include a keyboard, a mouse, a printer, a scanner, a display device, and other such components. Other examples of input devices and output devices are described herein. In some embodiments, a communication interface device can be implemented as a complete and separate computing device.

In operation, the computer system can be controlled by operating system software that includes a file management system, such as a disk operating system. One example of operating system software with associated file management system software is the family of Windows® operating systems and their associated file management systems. Another example of operating system software with its associated file management system software is the Linux™ operating system and its associated file management system including, but not limited to, the various types and implementations of the Linux® operating system and their associated file management systems. The file management system can be stored in the non-volatile memory and/or drive unit and can cause the processor to execute the various acts required by the operating system to input and output data and to store data in the memory, including storing files on the non-volatile memory and/or drive unit. As may be contemplated, other types of operating systems such as, for example, MacOS®, other types of UNIX® operating systems (e.g., BSD™ and descendants, Xenix™ SunOS™, HP-UX®, etc.), mobile operating systems (e.g., iOS® and variants, Chrome®, Ubuntu Touch®, watchOS®, Windows 10 Mobile®, the Blackberry® OS, etc.), and real-time operating systems (e.g., VxWorks®, QNX®, eCos®, RTLinux®, etc.) may be considered as within the scope of the present disclosure. As may be contemplated, the names of operating systems, mobile operating systems, real-time operating systems, languages, and devices, listed herein may be registered trademarks, service marks, or designs of various associated entities.

In some embodiments, the computing device 1102 can be connected to one or more additional computing devices such as computing device 1124 via a network 1122 using a connection such as the network interface 1120. In such embodiments, the computing device 1124 may execute one or more services 1126 to perform one or more functions under the control of, or on behalf of, programs and/or services operating on computing device 1102. In some embodiments, a computing device such as computing device 1124 may include one or more of the types of components as described in connection with computing device 1102 including, but not limited to, a processor such as processor 1104, a connection such as connection 1106, a cache such as cache 1108, a storage device such as storage device 1110, memory such as memory 1114, an input device such as input device 1116, and an output device such as output device 1118. In such embodiments, the computing device 1124 can carry out the functions such as those described herein in connection with computing device 1102. In some embodiments, the computing device 1102 can be connected to a plurality of computing devices such as computing device 1124, each of which may also be connected to a plurality of computing devices such as computing device 1124. Such an embodiment may be referred to herein as a distributed computing environment.

The network 1122 can be any network including an internet, an intranet, an extranet, a cellular network, a Wi-Fi network, a local area network (LAN), a wide area network (WAN), a satellite network, a Bluetooth® network, a virtual private network (VPN), a public switched telephone network, an infrared (IR) network, an internet of things (IoT network) or any other such network or combination of networks. Communications via the network 1122 can be wired connections, wireless connections, or combinations thereof. Communications via the network 1122 can be made via a variety of communications protocols including, but not limited to, Transmission Control Protocol/Internet Protocol (TCP/IP), User Datagram Protocol (UDP), protocols in various layers of the Open System Interconnection (OSI) model, File Transfer Protocol (FTP), Universal Plug and Play (UPnP), Network File System (NFS), Server Message Block (SMB), Common Internet File System (CIFS), and other such communications protocols.

Communications over the network 1122, within the computing device 1102, within the computing device 1124, or within the computing resources provider 1128 can include information, which also may be referred to herein as content. The information may include text, graphics, audio, video, haptics, and/or any other information that can be provided to a user of the computing device such as the computing device 1102. In an embodiment, the information can be delivered using a transfer protocol such as Hypertext Markup Language (HTML), Extensible Markup Language (XML), JavaScript®, Cascading Style Sheets (CSS), JavaScript® Object Notation (JSON), and other such protocols and/or structured languages. The information may first be processed by the computing device 1102 and presented to a user of the computing device 1102 using forms that are perceptible via sight, sound, smell, taste, touch, or other such mechanisms. In some embodiments, communications over the network 1122 can be received and/or processed by a computing device configured as a server. Such communications can be sent and received using PHP: Hypertext Preprocessor ("PHP"), Python™, Ruby, Perl® and variants, Java®, HTML, XML, or another such server-side processing language.

In some embodiments, the computing device 1102 and/or the computing device 1124 can be connected to a computing resources provider 1128 via the network 1122 using a network interface such as those described herein (e.g. network interface 1120). In such embodiments, one or more systems (e.g., service 1130 and service 1132) hosted within the computing resources provider 1128 (also referred to herein as within "a computing resources provider environment") may execute one or more services to perform one or more functions under the control of, or on behalf of, programs and/or services operating on computing device 1102 and/or computing device 1124. Systems such as service 1130 and service 1132 may include one or more computing devices such as those described herein to execute computer code to perform the one or more functions under the control of, or on behalf of, programs and/or services operating on computing device 1102 and/or computing device 1124.

For example, the computing resources provider 1128 may provide a service, operating on service 1130 to store data for the computing device 1102 when, for example, the amount of data that the computing device 1102 exceeds the capacity of storage device 1110. In another example, the computing resources provider 1128 may provide a service to first instantiate a virtual machine (VM) on service 1132, use that VM to access the data stored on service 1132, perform one or more operations on that data, and provide a result of those one or more operations to the computing device 1102. Such operations (e.g., data storage and VM instantiation) may be referred to herein as operating "in the cloud," "within a cloud computing environment," or "within a hosted virtual machine environment," and the computing resources provider 1128 may also be referred to herein as "the cloud." Examples of such computing resources providers include, but are not limited to Amazon® Web Services (AWS®), Microsoft's Azure®, IBM Cloud®, Google Cloud®, Oracle Cloud® etc.

Services provided by a computing resources provider 1128 include, but are not limited to, data analytics, data storage, archival storage, big data storage, virtual computing (including various scalable VM architectures), blockchain services, containers (e.g., application encapsulation), database services, development environments (including sandbox development environments), e-commerce solutions, game services, media and content management services, security services, serverless hosting, virtual reality (VR) systems, and augmented reality (AR) systems. Various techniques to facilitate such services include, but are not limited to, virtual machines, virtual storage, database services, system schedulers (e.g., hypervisors), resource management systems, various types of short-term, mid-term, long-term, and archival storage devices, etc.

As may be contemplated, the systems such as service 1130 and service 1132 may implement versions of various services (e.g., the service 1112 or the service 1126) on behalf of, or under the control of, computing device 1102 and/or computing device 1124. Such implemented versions of various services may involve one or more virtualization techniques so that, for example, it may appear to a user of computing device 1102 that the service 1112 is executing on the computing device 1102 when the service is executing on, for example, service 1130. As may also be contemplated, the various services operating within the computing resources provider 1128 environment may be distributed among various systems within the environment as well as partially distributed onto computing device 1124 and/or computing device 1102.

In an embodiment, the computing device 1102 can be connected to one or more additional computing devices and/or services such as merchant computing device 1136 and/or a point-of-sale service 1134 via the network 1122 and using a connection such as the network interface 1120. In an embodiment, the point-of-sale service 1134 is separate from the merchant computing device 1136. In an embodiment, the point-of-sale service 1134 is executing on the merchant computing device 1136. In an embodiment, the point-of-sale service 1134 is executing as one or more services (e.g., the service 1130 and/or the service 1132) operating within the environment of the computing resources provider. As used herein, a point-of-sale service 1134 is a service used by one or more merchants to manage sales transactions for customers, to process payment transactions for customers (e.g., payment instrument transactions), to manage inventory for merchants, to identify customers based on, for example, customer loyalty programs, and other such tasks.

In an embodiment, a customer and/or a merchant uses the merchant computing device 1136 to interact with the point-of-sale service 1134. In an embodiment, the merchant computing device 1136 is a dedicated point-of-service (POS) terminal. In an embodiment, the merchant computing device 1136 is a cash register system. In an embodiment, the merchant computing device 1136 is an application or web service operating on a computing device such as the computing device 1102 described herein. In such an embodiment, the application or web service may be provided by a financial services system (e.g., a bank, a transaction processing system, an inventory management system, or some other such financial services system). In an embodiment, the merchant computing device 1136 includes an auxiliary device or system to execute tasks associated with the point-of-sale service 1134 (e.g., a payment instrument processing device attached to a smart phone or tablet). In an embodiment, the merchant computing device 1136 is a kiosk that is located at a merchant location (e.g., in a merchant's "brick and mortar" store), in a high traffic area (e.g., in a mall or in an airport concourse), or at some other such location. In such an embodiment, the kiosk may include additional branding elements to allow associating the kiosk with a vendor. In an embodiment, the merchant computing device 1136 is a virtual device (e.g., a virtual kiosk) such as the virtual devices described herein. Although not illustrated here, in an embodiment, the merchant computing device 1136 may be one of a plurality of devices that may be interconnected using a network such as the network 1122.

In an embodiment, the computing device 1102 can be connected to one or more additional computing devices and/or services such as a payment instrument service 1138 via the network 1122 and using a connection such as the network interface 1120. In an embodiment, the payment instrument service 1138 connects directly with the point of sale service 1134. In an embodiment, elements of the payment instrument service 1138 are executing on the merchant computing device 1136. In an embodiment, the payment instrument service 1138 is executing as one or more services (e.g., the service 1130 and/or the service 1132) operating within the environment of the computing resources provider. As used herein, a payment instrument service 1138 is a service used by various entities (e.g., merchants, financial institutions, and account holders) to manage payment instrument transactions (e.g., sales and payments), process payment, to issue payment instruments to account holders, and to perform other such actions.

In an embodiment, elements of the payment instrument service 1138 are running as an application or web service operating on a computing device such as the computing device 1102 described herein. In such an embodiment, the application or web service of the payment instrument service 1138 may be provided by a financial services system (e.g., a bank, a transaction processing system, an inventory management system, or some other such financial services system). In an embodiment, elements of the payment instrument service 1138 are running on an auxiliary device or system configured to execute tasks associated with the payment instrument service 1138 (e.g., uses a payment instrument processing device attached to a smart phone or tablet). In an embodiment, elements of the payment instrument service 1138 are running on virtual device such as those described herein. Although not illustrated here, in an embodiment, the payment instrument service 1138 may be running on one or more of a plurality of devices that may be interconnected using a network such as the network 1122.

In an embodiment, the computing device 1102 can be connected to one or more additional computing devices and/or services such as an authentication service 1140 via the network 1122 and using a connection such as the network interface 1120. In an embodiment, the authentication service 1140 is an element of the payment instrument service 1138. In an embodiment, the authentication service 1140 is separate from the payment instrument service 1138. In an embodiment, the authentication service 1140 connects directly with the point of sale service 1134. In an embodiment, elements of the authentication service 1140 are executing on the merchant computing device 1136. In an embodiment, the authentication service 1140 is executing as one or more services (e.g., the service 1130 and/or the service 1132) operating within the environment of the computing resources provider. As used herein, an authentication service 1140 is a service used by one or more merchants to authenticate transactions associated with payment instruments. An authentication service may be a third-party service that provides secure and verified authorization of the transactions.

In an embodiment, elements of the authentication service 1140 are running as an application or web service operating on a computing device such as the computing device 1102 described herein. In such an embodiment, the application or web service of the authentication service 1140 may be provided by a financial services system (e.g., a bank, a transaction processing system, an inventory management system, or some other such financial services system). In an embodiment, elements of the authentication service 1140 are running on an auxiliary device or system configured to execute tasks associated with the authentication service 1140 (e.g., provides authentication using payment instrument processing device attached to a smart phone or tablet). In an embodiment, elements of the authentication service 1140 are running on virtual device such as those described herein. Although not illustrated here, in an embodiment, the authentication service 1140 may be running on one or more of a plurality of devices that may be interconnected using a network such as the network 1122.

Client devices, user devices, computer resources provider devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things such as those described herein. The input devices can include, for example, a keyboard, a mouse, a key pad, a touch interface, a microphone, a camera, and/or other types of input devices including, but not limited to, those described herein. The output devices can include, for example, a display screen, a speaker, a haptic feedback system, a printer, and/or other types of output devices including, but not limited to, those described herein. A data storage device, such as a hard drive or flash memory, can enable the computing device to temporarily or permanently store data. A network interface, such as a wireless or wired interface, can enable the computing device to communicate with a network. Examples of computing devices (e.g., the computing device 1102) include, but is not limited to, desktop computers, laptop computers, server computers, hand-held computers, tablets, smart phones, personal digital assistants, digital home assistants, wearable devices, smart devices, and combinations of these and/or other such computing devices as well as machines and apparatuses in which a computing device has been incorporated and/or virtually implemented.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described herein. The computer-readable data storage medium may form part of a computer program product, which may include packaging materials. The computer-readable medium may comprise memory or data storage media, such as that described herein. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices (e.g., a combination of a DSP and a microprocessor), a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

As used herein, the term "machine-readable media" and equivalent terms "machine-readable storage media," "computer-readable media," and "computer-readable storage media" refer to media that includes, but is not limited to, portable or non-portable storage devices, optical storage devices, removable or non-removable storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), solid state drives (SSD), flash memory, memory or memory devices.

A machine-readable medium or machine-readable storage medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like. Further examples of machine-readable storage media, machine-readable media, or computer-readable (storage) media include but are not limited to recordable type media such as volatile and non-volatile memory devices, floppy and other removable disks, hard disk drives, optical disks (e.g., CDs, DVDs, etc.), among others, and transmission type media such as digital and analog communication links.

As may be contemplated, while examples herein may illustrate or refer to a machine-readable medium or machine-readable storage medium as a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

Some portions of the detailed description herein may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

It is also noted that individual implementations may be described as a process which is depicted as a flowchart, a flow diagram, a data flow diagram, a structure diagram, or a block diagram. Although a flowchart, a flow diagram, a data flow diagram, a structure diagram, or a block diagram may describe the operations as a sequential process, many of the operations can be performed in parallel or concurrently. In addition, the order of the operations may be re-arranged. A process illustrated in a figure is terminated when its operations are completed, but could have additional steps not included in the figure. A process may correspond to a method, a function, a procedure, a subroutine, a subprogram, etc. When a process corresponds to a function, its termination can correspond to a return of the function to the calling function or the main function.

In some embodiments, one or more implementations of an algorithm such as those described herein may be implemented using a machine learning or artificial intelligence algorithm. Such a machine learning or artificial intelligence algorithm may be trained using supervised, unsupervised, reinforcement, or other such training techniques. For example, a set of data may be analyzed using one of a variety of machine learning algorithms to identify correlations between different elements of the set of data without supervision and feedback (e.g., an unsupervised training technique). A machine learning data analysis algorithm may also be trained using sample or live data to identify potential correlations. Such algorithms may include k-means clustering algorithms, fuzzy c-means (FCM) algorithms, expectation-maximization (EM) algorithms, hierarchical clustering algorithms, density-based spatial clustering of applications with noise (DBSCAN) algorithms, and the like. Other examples of machine learning or artificial intelligence algorithms include, but are not limited to, genetic algorithms, backpropagation, reinforcement learning, decision trees, liner classification, artificial neural networks, anomaly detection, and such. More generally, machine learning or artificial intelligence methods may include regression analysis, dimensionality reduction, metalearning, reinforcement learning, deep learning, and other such algorithms and/or methods. As may be contemplated, the terms “machine learning” and “artificial intelligence” are frequently used interchangeably due to the degree of overlap between these fields and many of the disclosed techniques and algorithms have similar approaches.

As an example of a supervised training technique, a set of data can be selected for training of the machine learning model to facilitate identification of correlations between members of the set of data. The machine learning model may be evaluated to determine, based on the sample inputs supplied to the machine learning model, whether the machine learning model is producing accurate correlations between members of the set of data. Based on this evaluation, the machine learning model may be modified to increase the likelihood of the machine learning model identifying the desired correlations. The machine learning model may further be dynamically trained by soliciting feedback from users of a system as to the efficacy of correlations provided by the machine learning algorithm or artificial intelligence algorithm (i.e., the supervision). The machine learning algorithm or artificial intelligence may use this feedback to improve the algorithm for generating correlations (e.g., the feedback may be used to further train the machine learning algorithm or artificial intelligence to provide more accurate correlations).

The various examples of flowcharts, flow diagrams, data flow diagrams, structure diagrams, or block diagrams discussed herein may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments) such as those described herein. A processor(s), implemented in an integrated circuit, may perform the necessary tasks.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

It should be noted, however, that the algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC (e.g., an iPad®, a Microsoft Surface®, a Chromebook®, etc.), a laptop computer, a set-top box (STB), a personal digital assistant (PDA), a mobile device (e.g., a cellular telephone, an iPhone®, and Android® device, a Blackberry®, etc.), a wearable device, an embedded computer system, an electronic book reader, a processor, a telephone, a web appliance, a network router, switch or bridge, or any system capable of executing a set of instructions (sequential or otherwise) that specify actions to be taken by that system. The system may also be a virtual system such as a virtual version of one of the aforementioned devices that may be hosted on another computer device such as the computer device 1102.

In general, the routines executed to implement the implementations of the disclosure, may be implemented as part of an operating system or a specific application, component, program, object, module or sequence of instructions referred to as “computer programs.” The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting or restricting the subject matter to the precise forms disclosed. Persons skilled in the relevant art can appreciate that many modifications and variations are possible in light of the above disclosure and may be made thereto without departing from the broader scope of the embodiments as set forth herein. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

As used herein, the terms "a" and "an" and "the" and other such singular referents are to be construed to include both the singular and the plural, unless otherwise indicated herein or clearly contradicted by context.

As used herein, the terms "comprising," "having," "including," and "containing" are to be construed as open-ended (e.g., "including" is to be construed as "including, but not limited to"), unless otherwise indicated or clearly contradicted by context.

As used herein, the recitation of ranges of values is intended to serve as a shorthand method of referring individually to each separate value falling within the range, unless otherwise indicated or clearly contradicted by context. Accordingly, each separate value of the range is incorporated into the specification as if it were individually recited herein.

As used herein, use of the terms "set" (e.g., "a set of items") and "subset" (e.g., "a subset of the set of items") is to be construed as a nonempty collection including one or more members unless otherwise indicated or clearly contradicted by context. Furthermore, unless otherwise indicated or clearly contradicted by context, the term "subset" of a corresponding set does not necessarily denote a proper subset of the corresponding set but that the subset and the set may include the same elements (i.e., the set and the subset may be the same).

As used herein, use of conjunctive language such as "at least one of A, B, and C" is to be construed as indicating one or more of A, B, and C (e.g., any one of the following nonempty subsets of the set {A, B, C}, namely: {A}, {B}, {C}, {A, B}, {A, C}, {B, C}, or {A, B, C}) unless otherwise indicated or clearly contradicted by context. Accordingly, conjunctive language such as "as least one of A, B, and C" does not imply a requirement for at least one of A, at least one of B, and at least one of C.

As used herein, the use of examples or exemplary language (e.g., "such as" or "as an example") is intended to more clearly illustrate embodiments and does not impose a limitation on the scope unless otherwise claimed. Such language in the specification should not be construed as indicating any non-claimed element is required for the practice of the embodiments described and claimed in the present disclosure.

As used herein, where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described herein. The elements and acts of the various examples described herein can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described herein to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described herein may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use.

What is claimed is:

1. A computer-implemented method, comprising:

receiving a request to update user data associated with a user, wherein the request includes a private cryptographic key corresponding to the user;

identifying a set of service provider systems authorized to receive the user data, wherein the set of service provider systems maintains nodes within a decentralized distributed ledger;

encrypting the updated user data using the private cryptographic key, resulting in encrypted user data;

encoding the encrypted user data in the decentralized distributed ledger, wherein when the encrypted user data is encoded, a cryptocontract associated with the user data and the decentralized distributed ledger automatically generates a public cryptographic key usable to decrypt the encrypted user data; and providing the public cryptographic key, wherein when the public cryptographic key is obtained by the set of service provider systems, the nodes associated with the set of service provider systems automatically use the public cryptographic key to decrypt the encrypted user data.

2. The computer-implemented method of claim 1, further comprising:

receiving a request to deauthorize a service provider system associated with the set of service provider systems from accessing the user data; and encoding the encrypted user data in the decentralized distributed ledger to cause the cryptocontract to automatically generate a new public cryptographic key, wherein the new public cryptographic key is not provided to the service provider system.

3. The computer-implemented method of claim 1, wherein the public cryptographic key is provided through an encrypted update message, and wherein the encrypted update message is generated using private cryptographic keys associated with the set of service provider systems.

4. The computer-implemented method of claim 1, further comprising:

receiving a request to add a new service provider system to the set of service provider systems; and encrypting the public cryptographic key using a private cryptographic key associated with the new service provider system to provide the public cryptographic key to the new service provider system.

5. The computer-implemented method of claim 1, wherein the private cryptographic key corresponding to the user is provided through a user digital wallet.

6. The computer-implemented method of claim 1, wherein the set of service provider systems are identified through a distribution list, and wherein the distribution list specifies unique foreign identifiers corresponding to the set of service provider systems.

7. The computer-implemented method of claim 1, wherein the public cryptographic key is provided through one or more application programming interface (API) calls to the set of service provider systems.

8. A system, comprising:

one or more processors; and memory storing thereon instructions that, as a result of being executed by the one or more processors, cause the system to:

receive a request to update user data associated with a user, wherein the request includes a private cryptographic key corresponding to the user;

identify a set of service provider systems authorized to receive the user data, wherein the set of service provider systems maintains nodes within a decentralized distributed ledger;

encrypt the updated user data using the private cryptographic key, resulting in encrypted user data;

encode the encrypted user data in the decentralized distributed ledger, wherein when the encrypted user data is encoded, a cryptocontract associated with the decentralized distributed ledger and the user data automatically generates a public cryptographic key usable to decrypt the encrypted user data; and provide the public cryptographic key, wherein when the public cryptographic key is obtained by the set of service provider systems, the nodes associated with the set of service provider systems automatically use the public cryptographic key to decrypt the encrypted user data.

9. The system of claim 8, wherein the instructions further cause the system to:

receive a request to deauthorize a service provider system associated with the set of service provider systems from accessing the user data; and encode the encrypted user data in the decentralized distributed ledger to cause the cryptocontract to automatically generate a new public cryptographic key, wherein the new public cryptographic key is not provided to the service provider system.

10. The system of claim 8, wherein the public cryptographic key is provided through an encrypted update message, and wherein the encrypted update message is generated using private cryptographic keys associated with the set of service provider systems.

11. The system of claim 8, wherein the instructions further cause the system to:

receive a request to add a new service provider system to the set of service provider systems; and encrypt the public cryptographic key using a private cryptographic key associated with the new service provider system to provide the public cryptographic key to the new service provider system.

12. The system of claim 8, wherein the private cryptographic key corresponding to the user is provided through a user digital wallet.

13. The system of claim 8, wherein the set of service provider systems are identified through a distribution list, and wherein the distribution list specifies unique foreign identifiers corresponding to the set of service provider systems.

14. The system of claim 8, wherein the public cryptographic key is provided through one or more application programming interface (API) calls to the set of service provider systems.

15. A non-transitory, computer-readable storage medium storing thereon executable instructions that, as a result of being executed by one or more processors of a computer system, cause the computer system to:

receive a request to update user data associated with a user, wherein the request includes a private cryptographic key corresponding to the user;

identify a set of service provider systems authorized to receive the user data, wherein the set of service provider systems maintains nodes within a decentralized distributed ledger;

encrypt the updated user data using the private cryptographic key, resulting in encrypted user data;

encode the encrypted user data in the decentralized distributed ledger, wherein when the encrypted user data is encoded, a cryptocontract associated with the decentralized distributed ledger and the user data automatically generates a public cryptographic key usable to decrypt the encrypted user data; and provide the public cryptographic key, wherein when the public cryptographic key is obtained by the set of service provider systems, the nodes associated with the set of service provider systems automatically use the public cryptographic key to decrypt the encrypted user data.

16. The non-transitory, computer-readable storage medium of claim 15, wherein the executable instructions further cause the computer system to:

receive a request to deauthorize a service provider system associated with the set of service provider systems from accessing the user data; and encode the encrypted user data in the decentralized distributed ledger to cause the cryptocontract to automatically generate a new public cryptographic key, wherein the new public cryptographic key is not provided to the service provider system.

17. The non-transitory, computer-readable storage medium of claim 15, wherein the public cryptographic key is provided through an encrypted update message, and wherein the encrypted update message is generated using private cryptographic keys associated with the set of service provider systems.

18. The non-transitory, computer-readable storage medium of claim 15, wherein the executable instructions further cause the computer system to:

receive a request to add a new service provider system to the set of service provider systems; and encrypt the public cryptographic key using a private cryptographic key associated with the new service provider system to provide the public cryptographic key to the new service provider system.

19. The non-transitory, computer-readable storage medium of claim 15, wherein the private cryptographic key corresponding to the user is provided through a user digital wallet.

20. The non-transitory, computer-readable storage medium of claim 15, wherein the set of service provider systems are identified through a distribution list, and wherein the distribution list specifies unique foreign identifiers corresponding to the set of service provider systems.

21. The non-transitory, computer-readable storage medium of claim 15, wherein the public cryptographic key is provided through one or more application programming interface (API) calls to the set of service provider systems.

* * * * *